United States Patent
Pasumarthi et al.

(10) Patent No.: US 9,043,330 B2
(45) Date of Patent: May 26, 2015

(54) NORMALIZED SEARCH

(75) Inventors: Suresh Pasumarthi, Bangalore (IN);
Som Ranjan Satpathy, Bangalore (IN);
Ganesh Vaitheeswaran, Bangalore (IN)

(73) Assignee: BUSINESS OBJECTS SOFTWARE LTD. (IE)

(*) Notice: Subject to any disclaimer, the term of this patent is extended or adjusted under 35 U.S.C. 154(b) by 78 days.

(21) Appl. No.: 13/586,869

(22) Filed: Aug. 16, 2012

(65) Prior Publication Data

US 2013/0173606 A1 Jul. 4, 2013

(51) Int. Cl.
*G06F 7/00* (2006.01)
*G06F 17/30* (2006.01)

(52) U.S. Cl.
CPC .... *G06F 17/30336* (2013.01); *G06F 17/30386* (2013.01)

(58) Field of Classification Search
CPC .................................................. G06F 17/3053
USPC ....................................................... 707/741
See application file for complete search history.

(56) References Cited

U.S. PATENT DOCUMENTS

| | | | |
|---|---|---|---|
| 2007/0208669 A1* | 9/2007 | Rivette et al. | 705/59 |
| 2008/0082495 A1 | 4/2008 | Polo-Malouvier et al. | |
| 2010/0005054 A1* | 1/2010 | Smith et al. | 707/2 |

* cited by examiner

*Primary Examiner* — Ajith Jacob
(74) *Attorney, Agent, or Firm* — Horizon IP Pte. Ltd.

(57) ABSTRACT

Systems and methods of searching by a processor are described herein. In accordance with one aspect of the present disclosure, a master index having a plurality of index documents corresponding to artifacts stored in a repository is generated. An index document maps contents from a source artifact to index categories having different default boost values indicating relative importance of the index categories. A search query is fired by a user to search the master index. A result list of artifacts having contents matching (hit) the search query is generated. Artifacts are ranked in the list based on hit scores according to number of hits, which categories the hits occurred and the default boost values of the index categories.

20 Claims, 22 Drawing Sheets

Title: Global Sales Report I
Author: Author I

| Country | Customer | Revenue |
|---|---|---|
| India | Reliance | 100000 |
| India | Tata | 200000 |
| India | Airtel | 260000 |
| US | Wallmart | 300000 |
| US | Pepsi | 150000 |
| Japan | Sony | 190500 |
| US | Colgate | 3500000 |

FIG. 3b

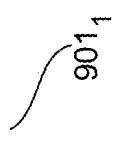
| Country | Customer | Revenue |
|---|---|---|
| India | Reliance | 100000 |
| India | Tata | 200000 |
| India | Airtel | 260000 |
| US | Wallmart | 300000 |
| US | Pepsi | 150000 |
| Japan | Sony | 190500 |
| US | Colgate | 3500000 |
FIG. 9a$_1$

| Customer | Revenue |
|---|---|
| India | |
| Reliance | 100000 |
| Tata | 200000 |
| Airtel | 260000 |
| US | |
| Wallmart | 300000 |
| Pepsi | 150000 |
| Colgate | 3500000 |
| Japan | |
| Sony | 190500 |

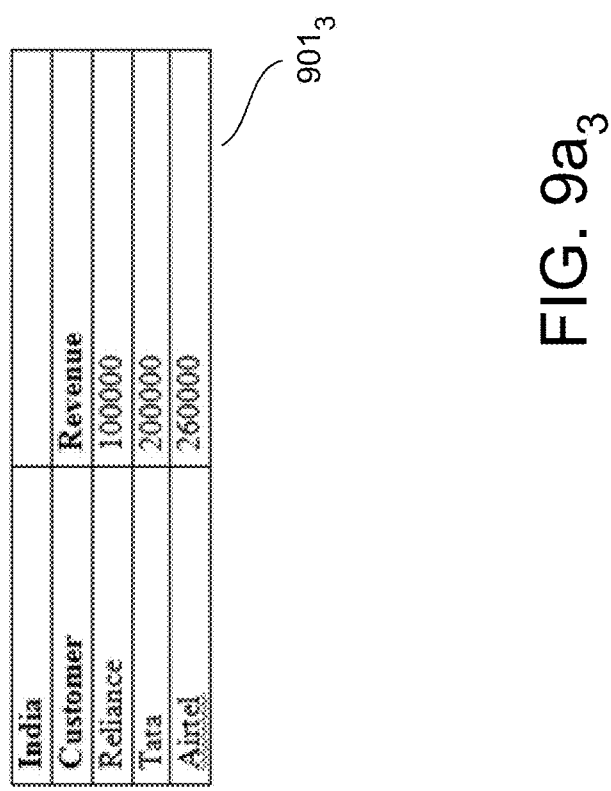
FIG. 9a₃

| | |
|---|---|
| boe.search.enterprisemetadata: | Global Sales Report I |
| boe.search.documentmetadata: | Author I |
| boe.search.contentmetadata: | Country |
| boe.search.contentmetadata: | Customer |
| boe.search.contentmetadata: | Revenue |
| boe.search.content: | India |
| boe.search.content: | US |
| boe.search.content: | Japan |
| boe.search.content: | Reliance |
| boe.search.content: | Tata |
| boe.search.content: | Airtel |
| boe.search.content: | Wallmart |
| boe.search.content: | Pepsi |
| boe.search.content: | Sony |
| boe.search.content: | Colgate |
| boe.search.content: | 100000 |
| boe.search.content: | 200000 |
| boe.search.content: | 260000 |
| boe.search.content: | 300000 |
| boe.search.content: | 150000 |
| boe.search.content: | 190500 |
| boe.search.content: | 3500000 |

| | |
|---|---|
| boe.search.enterprisemetadata: | Global Sales Report II |
| boe.search.documentmetadata: | Author II |
| boe.search.contentmetadata: | Customer |
| boe.search.contentmetadata: | Revenue |
| boe.search.contentmetadata: | India |
| boe.search.contentmetadata: | US |
| boe.search.contentmetadata: | Japan |
| boe.search.content: | Reliance |
| boe.search.content: | Tata |
| boe.search.content: | Airtel |
| boe.search.content: | Wallmart |
| boe.search.content: | Pepsi |
| boe.search.content: | Colgate |
| boe.search.content: | Sony |
| boe.search.content: | 100000 |
| boe.search.content: | 200000 |
| boe.search.content: | 260000 |
| boe.search.content: | 300000 |
| boe.search.content: | 150000 |
| boe.search.content: | 190500 |

| boe.search.enterprisemetadata: | India Sales Report II |
| boe.search.documentmetadata: | Author III |
| boe.search.contentmetadata: | India |
| boe.search.contentmetadata: | Customer |
| boe.search.contentmetadata: | Revenue |
| boe.search.content: | Reliance |
| boe.search.content: | Tata |
| boe.search.content: | Airtel |
| boe.search.content: | 100000 |
| boe.search.content: | 200000 |
| boe.search.content: | 260000 |

NORMALIZED SEARCH

TECHNICAL FIELD

The present disclosure relates generally to intelligent tools. In particular, an intelligent tool includes a search engine for performing normalized searching.

BACKGROUND

An important aspect in the Business Intelligence (BI) domain is to get the relevant information timely. Business Analysts rely on BI products to derive quality facts from huge volumes of historical and current data to make effective decisions. They increasingly depend on the search feature of a BI product to achieve this.

Different kinds of BI artifacts are present in a BI repository. The BI artifacts serve different purposes for different personas. For example, in SAP Business Objects, BI artifacts include Crystal Reports, Web Intelligence, Desktop Intelligence, Xcelsius, Pioneer, BI workspaces, and Information Spaces. Every BI artifact has its own format and purpose. There may be some BI artifacts which have saved data and others just metadata. Furthermore, different users end up creating the same content in different representations for the same data. Just as an example, the same data can be represented in different formats within the same type of document.

Under such a scenario, a search would return numerous BI artifacts having multiple formats. For conventional BI search engines, the ranking of these BI artifacts are based only on existence of data queried in reports, charts, tables and other BI artifacts and the number of terms matched.

However, such ranking techniques may be insufficient since it does not take into account of the different structures or content context of the BI artifacts. For example, a term may be matched in a portion of an artifact which is not important to a user as if it matched in another portion of an artifact. This may lead to a scenario where the former BI artifact is ranked higher than the latter, merely because more terms are matched. However, the higher ranking may lead the user to the wrong BI artifact. This may mislead the user to the non-relevant BI artifacts, which waste time, particularly with a search list having numerous BI artifacts.

Accordingly, there is a need to provide improved searching which allows more meaningful ranking to provide context to search results.

SUMMARY

Described herein are systems and methods of searching by a processor. In accordance with one aspect of the present disclosure, a master index having a plurality of index documents corresponding to artifacts stored in a repository is generated. An index document maps contents from a source artifact to index categories having different default boost values indicating relative importance of the index categories. A search query is fired by a user to search the master index. A result list of artifacts having contents matching (hit) the search query is generated. Artifacts are ranked in the list based on hit scores according to number of hits, which categories the hits occurred and the default boost values of the index categories.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 3b shows an example of an artifact.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for searching is described herein. The search framework may be used, for example, to identify relevant information stored in a repository. The repository, for example, stores information, such as artifacts. Artifacts may include different types of documents or data sources. In one embodiment, the repository is a business intelligence (BI) repository. The repository stores BI artifacts. The artifacts may include different types of documents, reports, Web intelligence, Desktop intelligence, BI workspaces and information spaces. Other types of BI artifacts, documents or data sources may also be contained in the BI repository. In one implementation, the search framework can effectively identify relevant BI artifacts for users. The framework may be integrated into a BI application. In other embodiments, the framework may be a stand alone framework.

Figure 1:
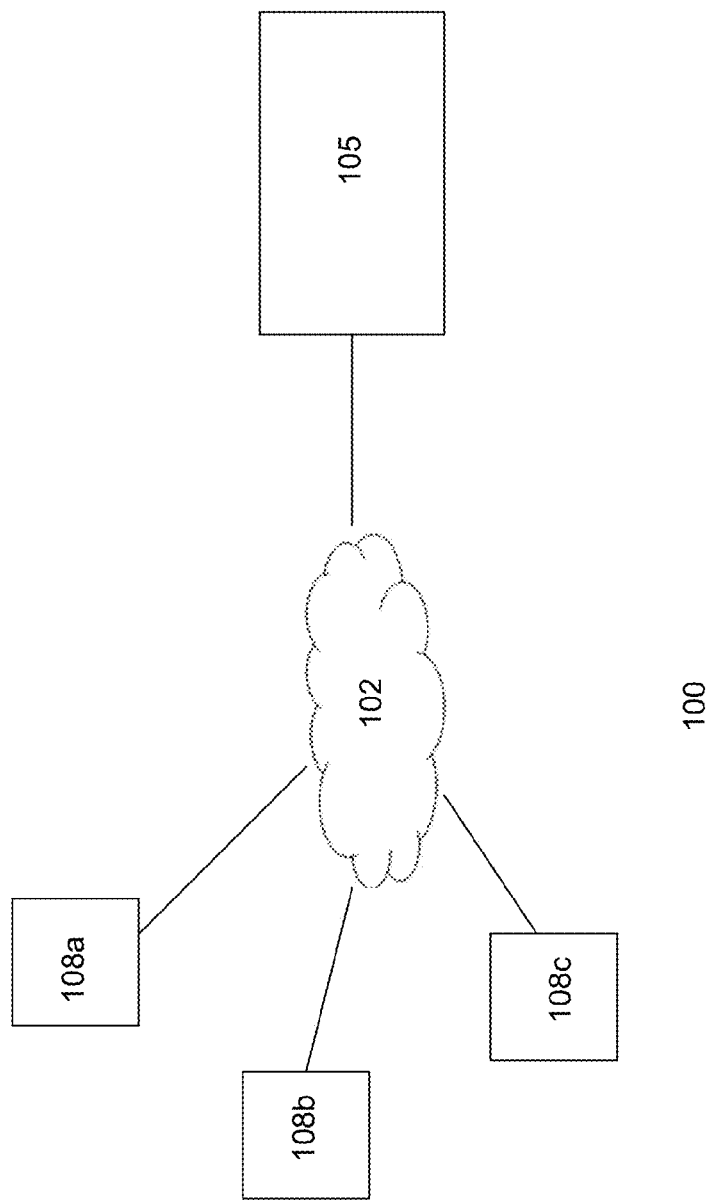
FIG. 1 shows an embodiment of an environment.

FIG. 1 shows a block diagram of an exemplary environment 100. The environment, for example, facilitates searching for information. The environment may have a client/ server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients. Other types of environments may also be useful. For example, the environment may be a non-client/server architecture or a combination of client/server and non-client/server architectures.

The communication network, for example, may be a local area network (LAN) which interconnects different devices, such as the clients and server. The devices may be coupled via the network by wireless and/or wired connections. In one other embodiment, the communication network may be a wide area network (WAN). Other types of networks may also be useful.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any memory. The memory may be volatile or non-volatile types of memories, such as magnetic media, optical media, random access memory (RAM), read-only memory (ROM), removable media, or any other suitable local or remote memory component. In one embodiment, the memory includes a repository for storing contents which a search is conducted.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, a workstation, a network computer, a kiosk, a personal data assistant (PDA) or a smart mobile device or phone. Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interact with the environment for various purposes. For example, the interface may be used to access various applications in the environment. The user interface may also serve other purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 2A:
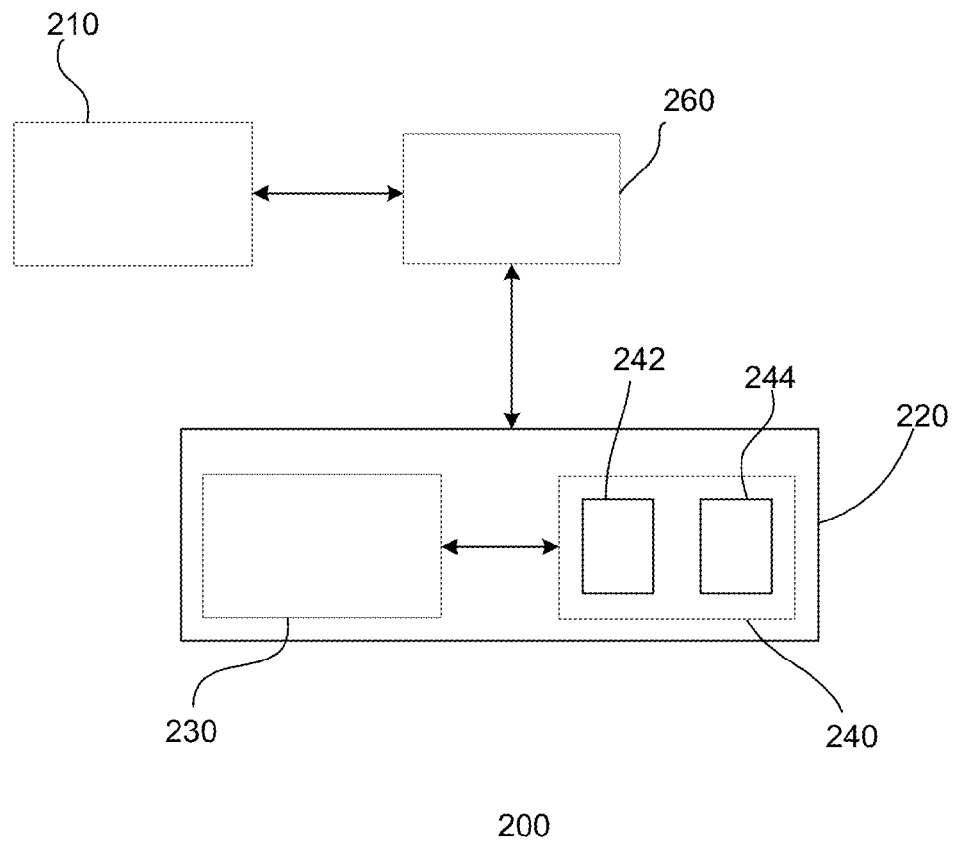
FIG. 2a shows an embodiment of a software environment.

FIG. 2a shows an embodiment of a software environment 200. The software environment, for example, may be referred to as an enterprise environment. The software environment may be implemented in the environment 100 of FIG. 1. As shown, the software environment may include a repository 260. The repository, for example, stores information, such as artifacts. The repository serves as a data source for the software environment. For example, the repository contains data sources accessible by the software environment. In one embodiment, the repository is a BI repository. The repository stores or contains BI artifacts. The BI artifacts may include different types of information, including documents, reports, spreadsheets, XML files, flat files, web service files, Web intelligence, Desktop intelligence, BI intelligence reports, such as Crystal Reports from SAP AG, BI workspaces and information spaces. Other types of BI artifacts, documents, or data sources may also be included in the repository. The information contained in the BI artifacts, for example, may include enterprise information. Enterprise information may be information pertaining to the enterprise environment. For example, enterprise information may be about an industry, a business or company or the enterprise. Such information may include, for example, employee data, sales data, strategic plans, work topics or other types of data related to the company or any information relevant to the company, such as industry, market and competitor information. Providing artifacts containing other types of information, such as real estate, may also be useful. In other embodiment, the repository may include other types of information, including non-BI information.

The artifacts may be generated from one or more software applications 210, such as database or other types of software applications. The software application may include various types of functions, such as report generation and functions related to data analytics. The software application may include a C/S architecture. For example, data, reports and other information may be stored in a server. In other embodiments, the software application may be locally installed in a client or a stand alone computer. In such cases, the data, reports and other information are locally stored.

In one embodiment, the software application may be a business application. Various types of business applications may be used. The business applications, for example, maintain data of a business, create business reports or perform analytics relating to the data. Such business applications may include, for example, SAP Crystal Solutions, including Xcelsius, Crystal Reports, Web Intelligence from SAP AG. Other types of business applications or suites of business applications may also be useful. Generating artifacts from other types of applications may also be useful.

The software environment may include additional applications which interact with the repository, business application and a search engine. Additional applications, such as Microsoft Office, Adobe and/or a web portal may be provided in the software environment.

A search system 220 is provided in the software environment. The search system provides a tool for a user to search for relevant information in the repository. The search system and other applications may be implemented in tangibly encoded machine-executable instructions to perform functions on a computer system, client system, or across network of the environment 100 of FIG. 1. The repository may be a single repository or multiple repositories in different locations to which the search system has access. Other configurations of repositories may also be useful. Multiple repositories may be collectively referred to as a repository. The repository, for example, may be a BusinessObjects repository from SAP AG Other types of repositories may also be useful. In one embodiment, the search module provides context content searching capabilities. The search system, in context content searching, ranks search results based on context content. For example, relevancy of artifacts from the search result is ranked based on search context.

At the highest level, the search module may include a search user interface (UI). The search UI enables a user to enter a search query which is the basis of a search. One or more viewing zones may be provided to display results of the search.

Figure 2B:
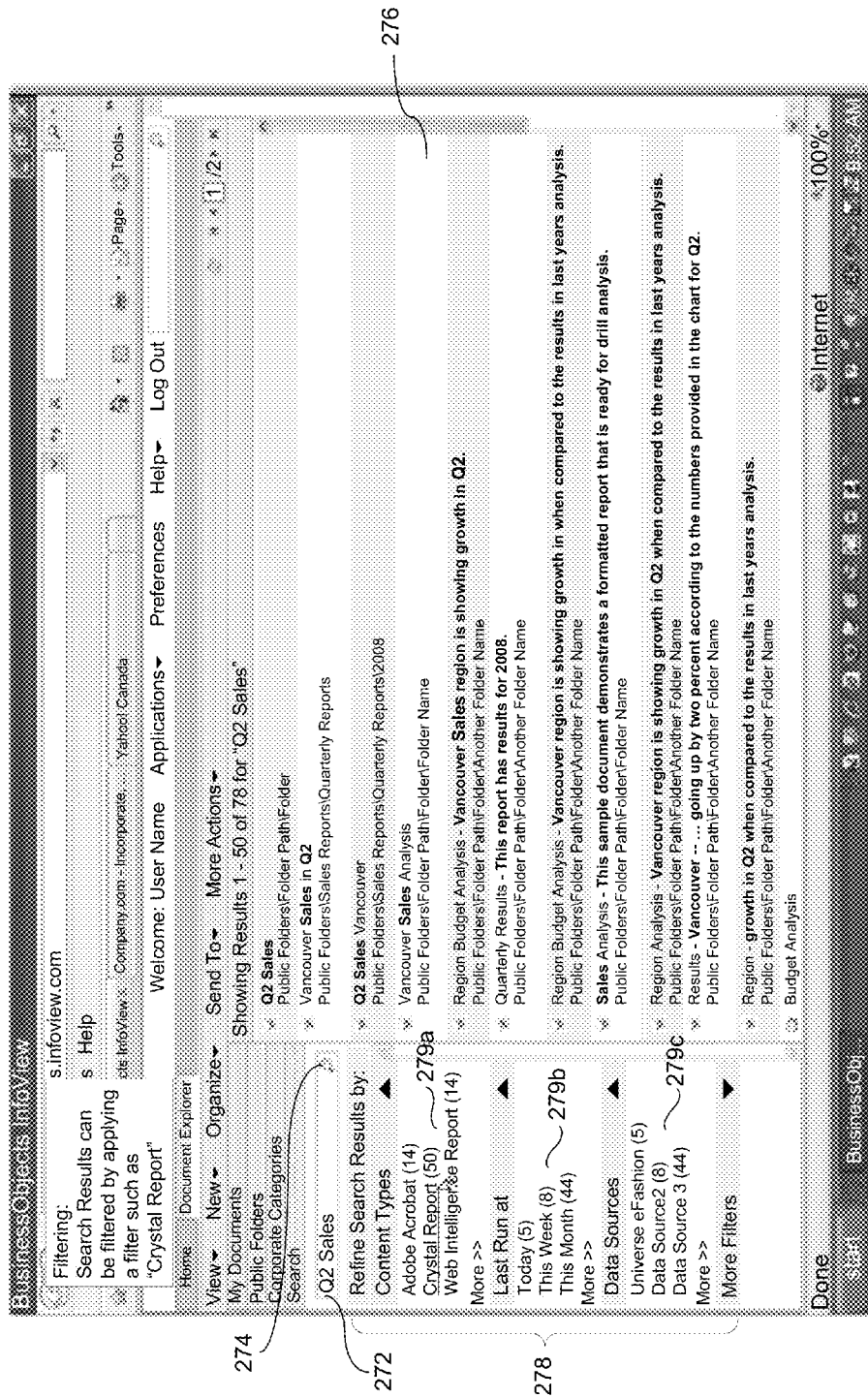
FIG. 2b shows an embodiment of a search user interface (UI)

FIG. 2b shows an embodiment of a search UI 270. The search UI may include a search panel 272 in which a user may enter a search query. For example, the search query entered by the user is the phrase "Q2 Sales". The search may be fired by, for example, clicking on a search button 274, causing the search engine to search the repository for BI artifacts with the phrase Q2 Sales. The result of the search may be displayed in a result window or viewing zone 276. As shown, the repository shows 78 documents containing the phrase Q2 sales. The search results are displayed, in one embodiment, in an order based on normalized ranking.

The search UI may include a search function zone 278. The search function zone includes, for example, filters to refine the search. For example, the UI may include filters based on document types in a first filter zone 279a, filters based on previous searches (e.g., last run) in a second filter zone 279b, and filters based on repository or data source in a third filter zone 279c. Additional filters may also be provided by the search UI. The search UI may also include links for quick access by the user. Other functions or links may be provided in the search UI.

In one embodiment, the search system includes an indexing module 230 and a search module 240 as shown in FIG. 2a. The indexing module, in one embodiment, performs context indexing of an artifact while the search module performs searching of the repository based on a search query from a user. The search module, in one embodiment, includes a search agent 242 and a search engine 244. The search agent receives a search query from a user and processes it to form an internal search query which is used by the search engine to perform the search. The search agent normalizes the search result and provides it to the user. The search agent may include other functions, such as, for example, filtering functions. Other functions may also be provided by the search agent.

In one embodiment, the indexing module extracts information from an artifact for indexing. For example, when an artifact is created and stored in the repository, the indexing module may be initiated to extract indexing information from the artifact. The indexing module may be invoked automatically when saving an artifact into the repository. In other embodiments, the indexing module may be invoked by the user. Alternatively, the system or indexing module may query the user regarding the invocation of the indexing module.

To extract information, an extractor may be used. The extractor, for example, may be a plug in. Various types of extractors may be used. For example, extractors may be provided for different types of artifacts or documents. In one embodiment, different extractors may be provided for extracting information from different types of artifacts. For example, separate extractors may be used for PDF, Word, Excel, Crystal Reports as well as other types of artifacts. Different types of extractors may employ different extraction techniques for content extraction and mapping source content or indexing information into a common search index scheme. For example, PDF artifacts may be extracted page-by-page while Crystal Reports, using Crystal Reports SDK, are extracted in two phases. The first phase extracts static structures, such as headers, footers, labels, chart titles, legends or the like while the second phase extracts underlying table data in chunks. Extracting data in chunks minimizes memory usage. Other techniques for data extraction may also be employed.

Indexing information extracted, in one embodiment, is based on a set of index keys. An index key corresponds to a type of information of an artifact. The index keys, for example, define the various types of information which are contained in artifacts. The parts of an artifact that are searchable are based on the index keys.

The index keys, in one embodiment, are based on the structure of artifacts in the repository. For example, information of artifacts in the repository may be separated into logical levels based on the structure of the artifacts. Defining index keys using other factors may also be useful. The index document, as such, contains logical data structures representing the source artifact. For example, the index document is a logical construct of information representing the source artifact.

The index keys may be separated into index categories, for example, corresponding to logical levels of artifacts. In one embodiment, the index keys are separated into 4 index categories. Providing other number of index categories may also be useful. Table 1 shows an embodiment of the different index categories of an artifact.

TABLE 1

| | Category |
|---|---|
| 1 | Enterprise Metadata |
| 2 | Document Metadata |
| 3 | Content Metadata |
| 4 | Content |

As shown by Table 1, the index categories include enterprise metadata, document metadata, content metadata, and content, with enterprise metadata category being the highest and decreasing to the lowest category, which is the content category. Other type of index categories may also be useful. In one embodiment, the higher levels are metadata information. Metadata are generally provided by the creator of an artifact or personas who upload the artifact to the repository. The lowest level relates to content of the artifact. Content, for example, may include raw report and factual data of the BI artifact. The index keys separate the content of an artifact into different categories to build content context. For example, segregating the content of an artifact based on different index key categories builds content context.

Enterprise metadata, the highest index category refers to information that identifies different artifacts in the repository. For example, the enterprise metadata includes meta properties of artifacts stored in the repository. Table 2.1 shows examples of different types of index keys in the enterprise metadata index category. Other types of enterprise metadata index keys may also be useful.

TABLE 2.1

| No. | Enterprise Metadata | Description |
| --- | --- | --- |
| 1 | Object Title | Title of the artifact stored in the repository or document ID |
| 2 | Object Description | Summary of the artifact |
| 3 | Object Keyword | Keyword for the artifact |
| 4 | Object Kind | Artifact type (e.g., webi, Word, Crystal). |

Document metadata, the second highest index category, relates to general meta properties of an artifact. For example, MS Word type artifacts have meta properties such as author and subject, which are stored as part of the artifacts themselves. Table 2.2 shows examples of different types of index keys in the document metadata index category. Other types of document metadata index keys may also be useful.

TABLE 2.2

| No. | Document Metadata | Description |
| --- | --- | --- |
| 1 | Document Title | Document title stored inside the artifact |
| 2 | Document Subject | Subject of the artifact |
| 3 | Document Comments | Comments regarding the artifact |
| 4 | Document Keywords | Keywords of the artifact |
| 5 | Document Author | Creator of the artifact |

Content metadata, the third highest index category, relates to different fields of a document. For example, an artifact may include one or more reports. A report may be in the form of an R×C matrix, where R is equal to the number of rows and C is equal to the number of columns. Generally, the columns of a report may be referred to as a dimension of a report. Table 2.3 shows examples of different types of content metadata index keys in the content metadata category. Other types of content metadata index keys may also be useful.

TABLE 2.3

| No. | Content Metadata | Description |
| --- | --- | --- |
| 1 | Report Title, Report Header, Report Footer | Title, header and footer for a report in the artifact |
| 2 | Text Cells, Text Labels | User can add text box and put some content in it |
| 3 | Page Numbers | Page numbers of the artifact |

TABLE 2.3-continued

| No. | Content Metadata | Description |
| --- | --- | --- |
| 4 | All Dimension Names and Measures | Column names |
| 5 | Labels (Text Objects) | Information of objects in the artifact |
| 6 | Graph Levels, Graph Axis Labels, Graph Legends | Information related to a graph in the artifact |
| 7 | Section Headers | Information of sections of the artifact |
| 8 | Paragraph Content | Information of a paragraph in the artifact |

Content, the lowest index category, relates to content in a report. Table 2.4 shows an example of content index key in the content index category. Other types of contents may also be useful.

TABLE 2.4

| No. | Content | Description |
| --- | --- | --- |
| 1 | Column Values In a Report | Actual content in a column of a report in the artifact |

The index keys may be stored as index key objects in an index configuration file. Table 2.5 shows examples of index document index key objects for the different index categories of Tables 2.1-2.4.

TABLE 2.5

| Index Category | Index Document Key Objects |
| --- | --- |
| Enterprise Metadata | enterprise.search.id<br>enterprise.search.description<br>enterprise.search.keywords<br>enterprise.search.kind |
| Document Metadata | enterprise.search.title<br>enterprise.search.subject<br>enterprise.search.comments<br>enterprise.search.keywords<br>enterprise.search.author |
| Content Metadata | enterprise.search.contentmetadata |
| Content | enterprise.search.content |

The index key objects, for example, are defined at the system or enterprise level. The index key objects may be stored in an index configuration file. To define the index key objects, an index configuration (e.g., IndexConfig) object may be employed. The index key configuration file may be managed by a content administrator. The index configuration file may be located in a file system of the software environment.

In one embodiment, extracted source contents are mapped to the appropriate index categories in the index document. For example, the extracted source contents are mapped based on the index keys in the configuration file. The mapping of the extracted information may be performed after all source information has been extracted. In other cases, extracted information may be mapped as extracted. Other techniques of mapping the source information to the index keys may also be useful. The mapping process, for example, may depend on the extractor employed.

In one embodiment, the index document contains fields which map the content to the index key categories. For example, such fields may be referred to as index fields. An index field includes the index category name and value from the source artifact, forming a name/value pair.

In one embodiment, an index field may have the format name:value. The name portion of the field indicates the index category. The name portion indicates the different index categories and may have the following format:
1) boe.search.enterprisemetadata for enterprise metadata index key category;
2) boe.search.documentmetadata for document metadata index key category;
3) boe.search.contentmetadata for content metadata index key category; and
4) boe.search.content for content index key category.

Other formats for the name field may also be useful. For example, the name field may have the following format:
1) enterprisemetadata for enterprise metadata index key category;
2) documentmetadata for document metadata index key category;
3) contentmetadata for content metadata index key category; and
4) content for content index key category.

The value portion of the field includes source content corresponding to the index key name. For example, an artifact object corresponding to the artifact which is titled "Global Sales Report" will have the following index field:
boe.search.enterprisemetadata: Global Sales Report.
In other embodiments, the index field may be:
enterprisemetadata: Global Sales Report.

In one embodiment, the index document stores index fields from the highest index category to the lowest. For example, the index fields may be from the highest to the lowest index category as follows:
1) enterprise metadata index fields;
2) document metadata index fields;
3) content metadata index fields; and
4) content index fields.

Storing the index objects in other orders may also be useful. For example, the index fields may be stored in the order of source contents encountered by the extractor.

The index document, for example, is stored in file system or file system directory. Storing the index document in other locations of the software environment may also be useful. For example, the index document file may be stored in the repository. The index document may be stored in an index portion of the repository.

In some embodiments, one or more index document files may be associated with a source artifact. In the case where more than one index document is associated with a source artifact, the primary index document contains the contents of the source artifact while secondary documents contain hitlinks. The primary index document may be referred to as a master document while the secondary documents may be referred to as object documents. A hitlink is a reference to a specific position in the source artifact. A hitlink, for example, is useful to find the location of a match and its position in the artifact when a user opens the artifact from the search results page.

In one embodiment, a master index is provided. The master index, for example, is made up of a set of physical index documents of the artifacts. As such, the master index contains indexing information of artifacts in the repository. For example, the master index contains logical data structures of the artifacts. The master index, for example, contains other types of documents. For example, the master index may include documents other than the index documents which map source content to index categories.

To distinguish types of documents in a master index, a document type (doctype) field may be provided for each document in the master index. In the case where more than one index documents are associated with an artifact, the value of the doctype field for the primary index document may be master and the value for the doctype field for the secondary documents maybe object. Providing other values in the doctype field for the primary and secondary documents may also be useful. Other doctypes may also be available in the master index.

The index document may include other types of fields. For example, the index document may include a document_ID field. The document_ID field contains the unique document ID identifying the artifact whose contents the index document contains. Other types of fields may also be provided for documents in the master index. The types of fields may depend on the type of document in the master index.

The master index may be updated with new indexing information of a new artifact placed in the repository. A crawler can be provided to perform updating of the master index. The artifact IDs may be used to separate the different index documents in the master index. The master index may be stored in the file system. Storing the master index in other locations of the software environment may also be useful.

Figure 3A:
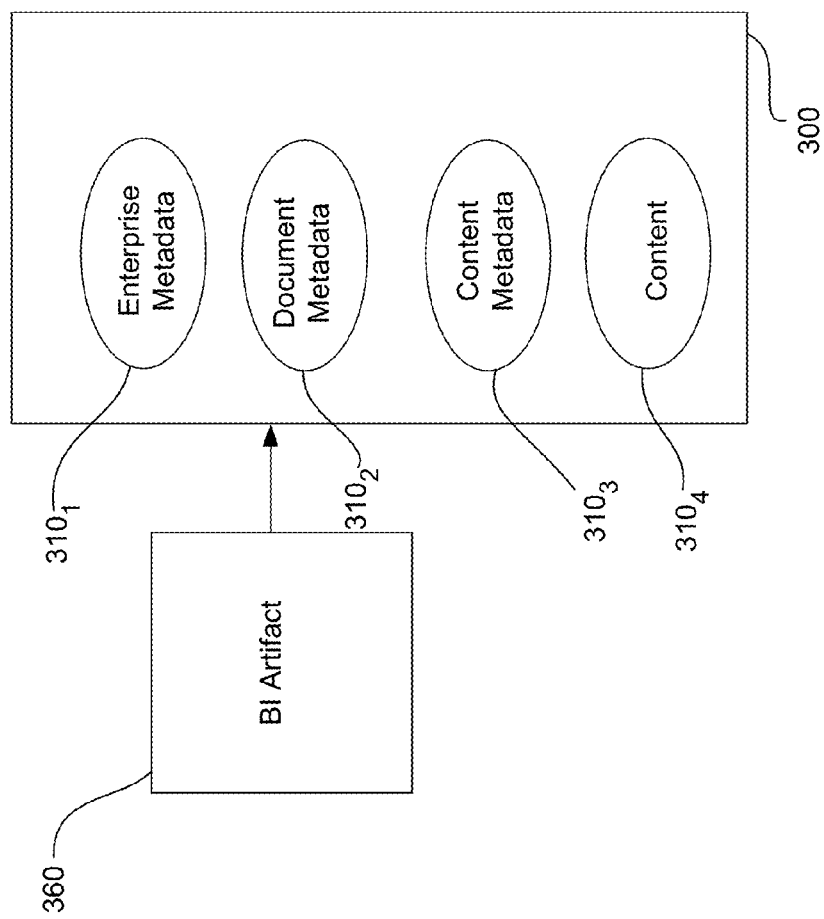
FIG. 3a shows a simplified embodiment of an index document.

FIG. 3a shows a simplified embodiment of an index document 300 for an artifact 360. The index document includes extracted information from the artifact. The extracted information is mapped as index field to facilitate normalized searching. The index document may be a part of a master index. The master index contains index documents of artifacts in the repository.

The index fields are based on index keys. In one embodiment, the index keys are separated into different index categories. In one embodiment, the index keys are separated into four index categories. Providing other number of index categories may also be useful. The different categories may correspond to structures or levels of artifacts in the repository. For example, the four categories include enterprise metadata $310_1$, document metadata $310_2$, content metadata $310_3$ and content $310_4$. The highest category is enterprise metadata. The lower levels include document metadata, content metadata and content, with content being the lowest.

The contents of the artifact are mapped to their corresponding index categories, forming index pairs. For example, extracted source information is mapped to its index key category. For example, enterprise metadata information is mapped to the enterprise metadata index category. Likewise, document metadata information is mapped to the document metadata index category, content metadata information is mapped to the content metadata index category, and content information is mapped to the content index category. It is understood that an index category may have more than one field. The number of fields in an index category depends on the contents extracted from the source artifact. Also, the index document may also include doctype and document_ID fields (not shown).

FIG. 3b shows an example of an artifact 360. The artifact includes a title 362 which identifies the artifact in the repository. The artifact also includes an author 364 identifying the creator of the artifact. As shown, the title is "Global Sales Report I" and the author is "Author I". The artifact includes a report. The report structure is a 2-dimensional matrix having rows 372 and columns 374. The columns have headings while rows represent entries corresponding to the headings. The columns represent a dimension of the report. The report includes a header row which defines names of the information contained in the columns. For example, a column header defines a dimension of the report, such as the type of information or value of the column. Providing an artifact with other number of reports or reports of different structures may also be useful. In the case where an artifact has more than 1 report, it is understood that the report structure need not be the same.

As shown, the report includes 7 rows $372_{1-7}$ and three columns $374_{1-3}$. The first column corresponds to country, the second column corresponds to customer of the country and the third column corresponds to revenues of customer of the country.

Figure 3C:
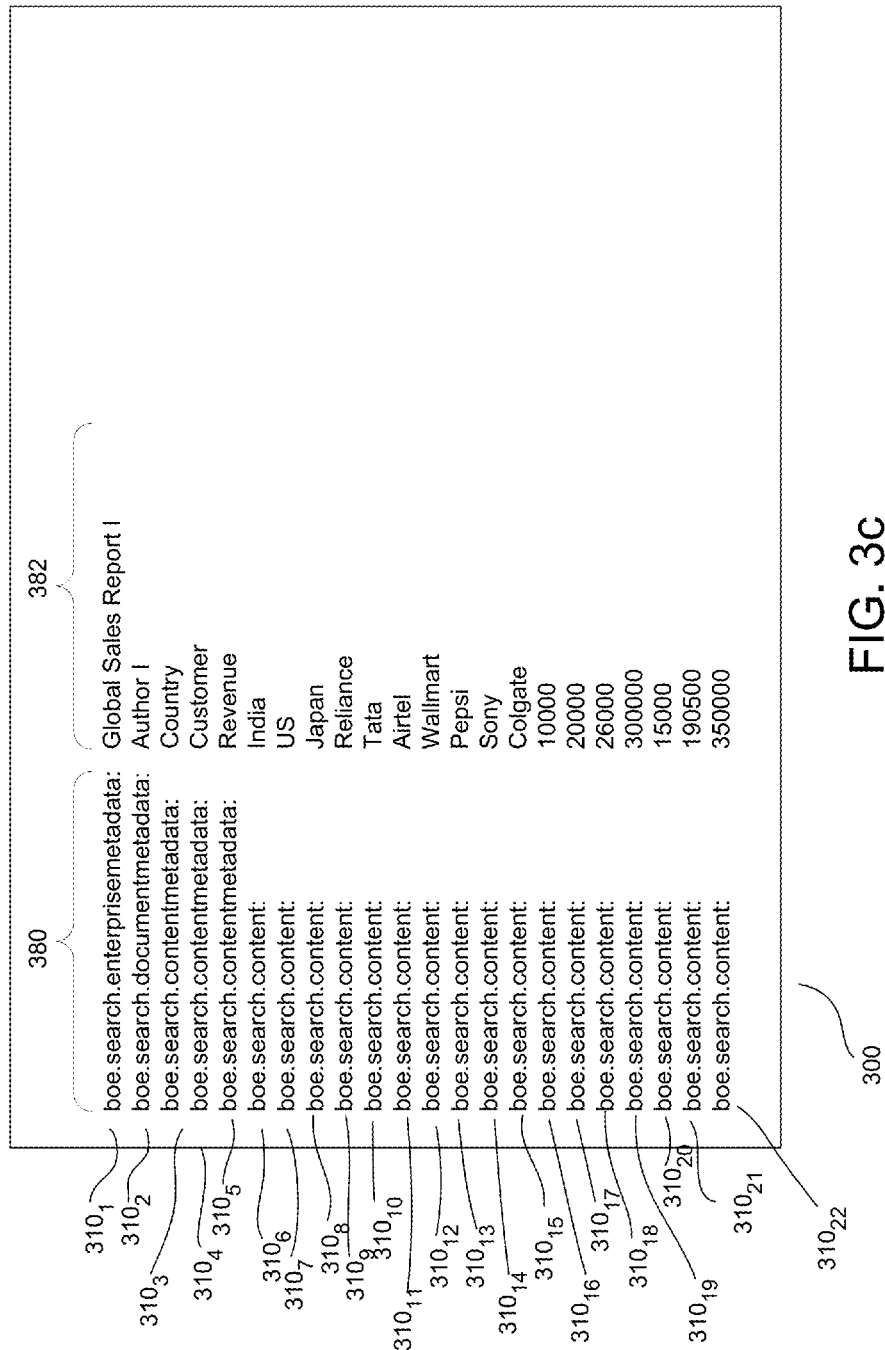
FIG. 3c shows an embodiment of an index document for the artifact of FIG. 3b.

FIG. 3c shows an index document 300 for the artifact 360 of FIG. 3b. The index document contains index fields 310. In one embodiment, an index field includes type or name portion 380 and value portion 382. In the example, the title of the artifact is stored as an index field $310_1$, which is "boe.search-.enterprisemetadata: Global Sales Report I". This corresponds to the title of the artifact stored in the repository which is in the enterprise metadata category. The author of the artifact is represented by index field $310_2$. The author value is in the document metadata category. Index fields $310_{3-5}$ relate to content metadata while index fields $310_{6-22}$ relate to contents of the report in the artifact.

In one embodiment, matches across dimensions for the same value are treated separately while matches within the same dimension are treated as a single hit. In one embodiment, contents that repeat itself within a dimension are not repeated. For example, contents that repeat itself within a column are not repeated. In this example, the value India and US each occurs three times in the Country column of the report. The value pairs within a column only take into account unique values. Non-unique values within a dimension are only accounted for once. This ensures matches in the same dimension are treated as a single hit.

In addition, the index document includes additional fields. In one embodiment, the index document includes doctype and document_ID fields (not shown). The value of the doctype field is, for example, master and the value of the document_ID field is equal to the artifact ID of the source artifact.

Figure 3D:
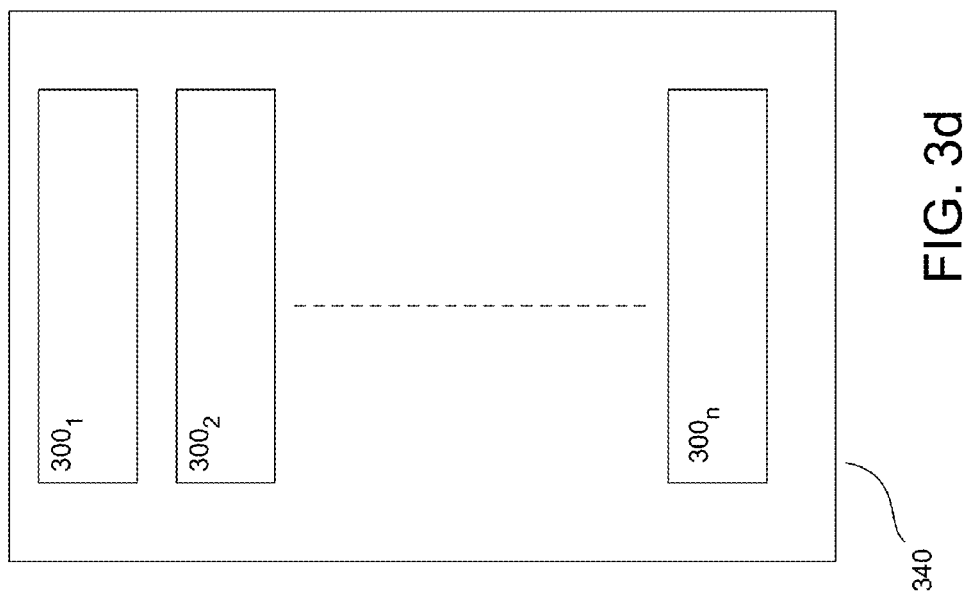
FIG. 3d shows an embodiment of a master index.

FIG. 3d shows an embodiment of a master index 340. The master index includes a plurality index documents $300_{1-n}$. The index documents, for example, correspond to the n artifacts in the repository. The index documents may be index documents as similarly described in FIG. 3c. The index documents of different artifacts may be identified by document_ID field.

Figure 4:
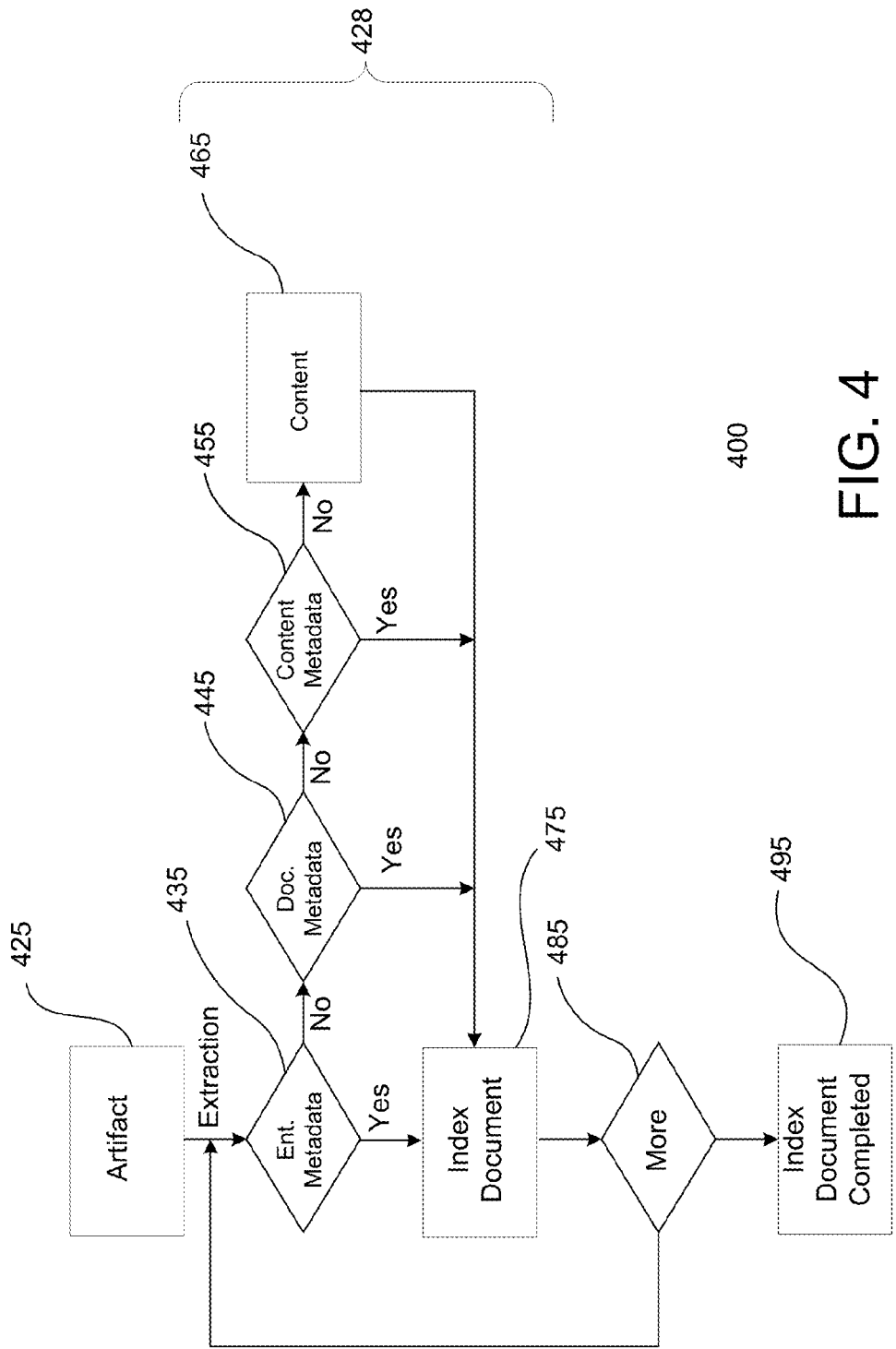
FIG. 4 shows an embodiment of a process for forming an index document.

FIG. 4 shows an embodiment of process 400 for forming an index document. An artifact is provided at step 425. The contents of the artifact are extracted using an extractor. The extracted contents or data are mapped to the index categories in a mapping stage 428. For example, extracted contents are mapped to index keys defined in an index configuration file. The index keys are associated to index categories. For example, the index keys may be associated to enterprise metadata, document metadata, content metadata and content index categories. All extracted information or data by the extractor is mapped at the mapping stage. The mapping stores fields, which are name/value pairs, in an index document. The name/value pairs map source information to index categories.

The mapping stage includes determining to which index category the extracted information belongs. In one embodiment, at step 435, the process mapping stage determines if the extracted information belongs to the enterprise metadata index category. If not, mapping stage proceeds to step 445 to determine if the extracted information belongs to the document metadata index category. If not, the mapping stage proceeds to step 455 to determine if the extracted information belongs to the content metadata index category. If not, the mapping stage proceeds to step 465 where it determines that the extracted information belongs to the lowest index category, which is the content index category.

Once extracted information is identified as belonging to a certain index category, a field is written to the index document at step 475. In one embodiment, the field is a name/value pair which maps the source information to its index category. At step 485, the process determines if there is more information to map. If so, the process returns to step 425 and repeats the mapping stage. If there is no more information to map, the document index file is completed at step 495. In one embodiment, the fields are stored in the index document file in an order as encountered by the extractor. Arranging the index fields in other orders may also be useful.

The process also provides document_ID and doctype fields for the index document. For example, the value of the document_ID field is the ID of the artifact whose content is extracted. The value of the doctype field is, for example, master.

As described, four different index categories are provided. An index key category is assigned a category boost value. Providing other number of index categories may also be useful. The sequence in which the extracted information is processed is from the highest to the lowest index category. It is understood that other sequences may be employed, as long as all categories are taken into account. For example, the extracted information may be processed from the lowest to the highest index key category. Non-sequential sequences may also be useful.

In other embodiments, the information may be processed based on the extractor employed. The extractor employed is, for example, based on the document type of the artifact. For example, in the case where information is extracted page by page, information may be mapped on a page by page basis.

The search module supports various types of searches. In one embodiment, the search module supports word searches, phrase searches and wildcard searches. To perform a search, a user enters a search query using the search agent and initiates or fires a search based on the search query.

A word search is based on a word query. In the case of a word search, the search engine identifies or returns enterprise content matching the word. A phrase search is based on a phrase query. A phrase query may be identified by quotation marks. Other techniques for identifying phrase are also useful. In the case of a phrase search, the search engine identifies or returns enterprise content matching the phrase. A wildcard search is based on a wildcard query. A wildcard, for example, is identified by a *. The wildcard corresponds to added information of a base term. The wildcard may be placed before or after a term to indicate the location of the added information with respect to the word. Providing a wildcard at other locations of a word may also be useful. In the case of a wildcard search, the search engine returns enterprise content that matches the base word with or without the added information corresponding to the wildcard.

As described, the search engine may support basic search functions such as a word, phrase or wildcard search. In other embodiments, the search engine may support more complex searching functions. For example, the search engine may support a search query which contains multiple items or terms. For example, the search query may include multiple words, phrases, wildcards or a combination thereof. For a search query having multiple items, connectors are used to connect the terms. The connectors, for example, are Boolean operators that indicate the relationship of the terms in the search query. Other configurations of connectors may also be useful. For search queries with more than 2 terms, a combination of connectors may be used. For example, the connectors which connect different terms need not be of the same type.

In one embodiment, a category boost value is provided. The category boost value is associated with a category. For example:
- an enterprise metadata boost value is associated with the enterprise metadata index category;
- a document metadata boost value is associated with the document metadata index category;
- a content metadata boost value is associated with the content metadata index category; and
- a content boost value is associated with the content index category.

Providing other granularity of boost values may also be useful. For example, boost values may have a finer granularity, such as associating boost values with index keys.

In one embodiment, the boost values are configurable. For example, different index category may be configured to have different boost values. This allows an administrator to render the relative importance of index categories with respect to one another. In one embodiment, the boost values are provided with initial default values. The default boost values, for example, may be referred to as static boost values. The default boost values may be provided in a configuration file. In one embodiment, the default boost values are provided in the index configuration file with the index object.

In one embodiment, the default boost values are configured such that higher index categories are assigned higher boost values. For example, the index category of the highest level will be assigned the highest boost value. Lower index key categories will be assigned lower boost values. For example, the boost value of the enterprise metadata category is higher than that of the document metadata category, the boost value of the document metadata category is higher than that of the content metadata category while the boost value of the content category is the lowest. Providing other configurations of default boost values may also be useful.

In one embodiment, the default boost values of the different index categories should have a gap which indicates the relative importance of one index category over another. For example, adjacent levels should have a value which is different by a factor of ten, with the more important index category having the higher value. For example, the boost value of the enterprise metadata level is 1000, document metadata level is 100, content metadata level is 10 and content level is 1. Providing other boost values for the different index categories may also be useful.

Assigning static boost values provides static weight normalization for searching based on relative importance. For example, static index category boost values provide static weight normalization for searching based on relative importance of the index categories. The static index category boost values may rank the search results (e.g., artifacts matching the search query) based on relative importance of one index category over others. The relative importance, for example, of index categories may be determined by the administrator. The factors which are used in considering the relative importance, for example, may depend on the persona to which the user belongs. For example, the administrator may decide to configure the static boost values such that the content index category has the highest boost values due to the design of the reports.

In one embodiment, the static boost values may be modified dynamically. That is, the static boost values may be changed to different values. The dynamic changing of static boost values may be based on history usage of a user. This provides dynamic boosting to determine relative importance of, for example, index categories based on the user, as determined by usage history of the user. The usage history takes into account, for example, search terms and prior artifacts opened based on the search terms. Other factors of usage history may also be taken into consideration.

Figure 5A:
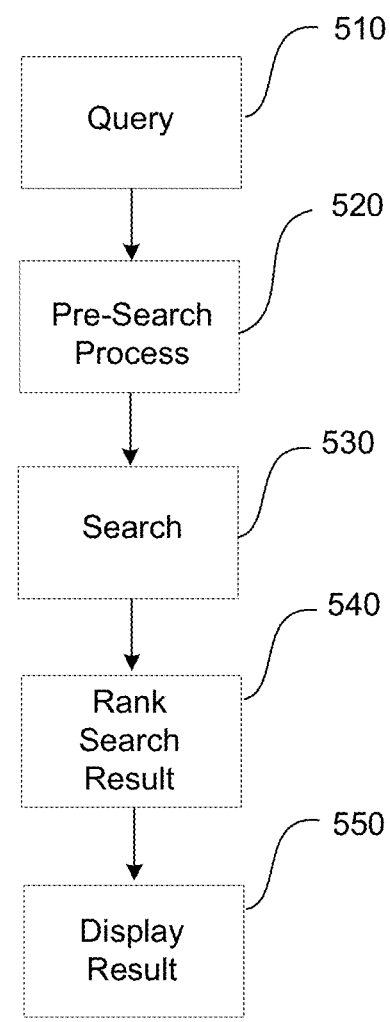
FIGS. 5a-b show embodiments of search processes.

FIG. 5a shows an embodiment of a search process 500. A user fires a search query at step 510. The user, for example, fires the search query using the search agent. In one embodiment, the search query is used to search the repository of the system. The search query may be a word, phrase, wildcard search query or a combination thereof. For example, the search query may include multiple items or terms whose relationships are defined by Boolean operators or connectors. It is understood that the terms or connectors need not be of the same type.

The process performs a pre-search process at step 520. In one embodiment, the pre-search process processes the query to produce an internal search query. Providing other or additional pre-search processes may also be useful. For example, the search agent performs the pre-search process to produce the internal search query which is used by the search engine.

In one embodiment, the search agent processes the search query by identifying the type of query and compiles an internal search query. The internal search query includes individual terms of the search query. For example, the search agent processes the query by identifying the individual terms and types of terms of the search query. In one embodiment, the query is processed to form an internal search query which includes individual terms of the search query and the various index categories appended to it.

In the case where there are four index categories, each term will include four sub-classes. The sub-classes are ORd together to form the internal search query. For example, for a search query with a single term India and four index categories (enterprise metadata, document metadata, content metadata and content) would be:
1) boe.search.enterprisemetadata: India;
2) boe.search.documentmetadata: India;
3) boe.search.contentmetadata: India; and
4) boe.search.content: India.

In one embodiment, the pre-search process facilitates a static normalized search. In one embodiment, the pre-search process associates static boost values to the internal search query. The static boost values, for example, are provided in a configuration file, such as an index configuration file. The static boost values may be provided using other techniques. In one embodiment, an index category is provided with a boost value. For example, different index categories will have different boost values. In one embodiment, the enterprise metadata index category is assigned the enterprise metadata boost value, the document metadata index category is assigned the document metadata boost value, the content metadata index category is assigned the content metadata boost value, and the content index category is assigned the content boost value.

The default boost values, for example, are 1000 for enterprise metadata index category, 100 for document metadata index category, 10 for content metadata index category, and 1 for content index category. Other default boost values may also be useful.

The internal search query is fired, initiating a search by the search engine at step 530. The search engine, in one embodiment, fires the internal search query over the master index. The master index, for example, contains the document index file of the BI artifacts in the repository. As discussed, the master index contains fields which are name/value pairs which map source contents to index categories in the artifacts.

Artifacts containing contents matching the internal query (artifact hits) are identified. Artifact hits are provided with hit scores. The hit score of an artifact is based on the number of hits of all terms of the search query and in which index category the hits occurred. In one embodiment, the hit score is equal to the total sum of the scores of all terms of the search query in each index category, where the score in an index category is equal to the number of hits in that category multiplied by the default boost value for that index category. For example, a single hit in the enterprise metadata index category results in a hit score of 1× enterprise metadata boost value. An artifact hit is associated with its respective hit score. The hit score, for example, is based on number of hits and index categories of the hits.

At step 540, the search results are ranked based on hit scores. In one embodiment, the search results are ranked based on the hit scores from the highest to the lowest. In the case where two artifacts have the same hit score, they would be ranked similarly. In other embodiments, the search agent may provide the user with options as to how the artifacts are displayed. The artifact hits are displayed based on the hit scores at step 550.

Providing static boost values for index categories facilitates normalized search. For example, different kinds of artifacts may have different structures. However, the indexing maps the contents of the artifacts appropriately to the index categories and with the index category boost values, ranking is normalized irrespective of the designs or types of the artifacts.

In some embodiments, the ranking of artifacts takes into account the device type from which the user is issuing the search request. Device type, for example, refers to the type of device, such as devices with a browser or a mobile device. Separating device types into other granularities may also be useful. For example, the device types may be categorized as desk tops, laptops, tablets, mobiles or smart phones. Different types of devices may have different characteristics, such as functionality or form factor. The device type information may be provided to the search module when a user fires a search query. For example, the device type information may be acquired at the pre-search processing step 520.

Information with respect to types of devices previously used to access an artifact may be stored, for example, as a property in an index document. Such information may be provided by a user log which monitors the actions of a user after a search. In one embodiment, the device type information may be extracted from the user log and stored in a document information (docinfo) type document. The docinfo may be part of the master index.

In one embodiment, the ranking of the hit artifacts at step 540 may be modified based on device type. In one embodiment, the ranking includes a primary or initial ranking process which is based on the hit scores of the hit artifacts. A secondary ranking process is then performed to separate the hit artifacts by device type. For example, artifacts are separated into two groups. The primary group includes artifacts of the hit list which are supported or supportable by the user device type and the secondary group includes the remaining hit artifacts. The primary group is ranked based on the hit scores and the secondary group is ranked based on the hit scores.

Figure 5B:
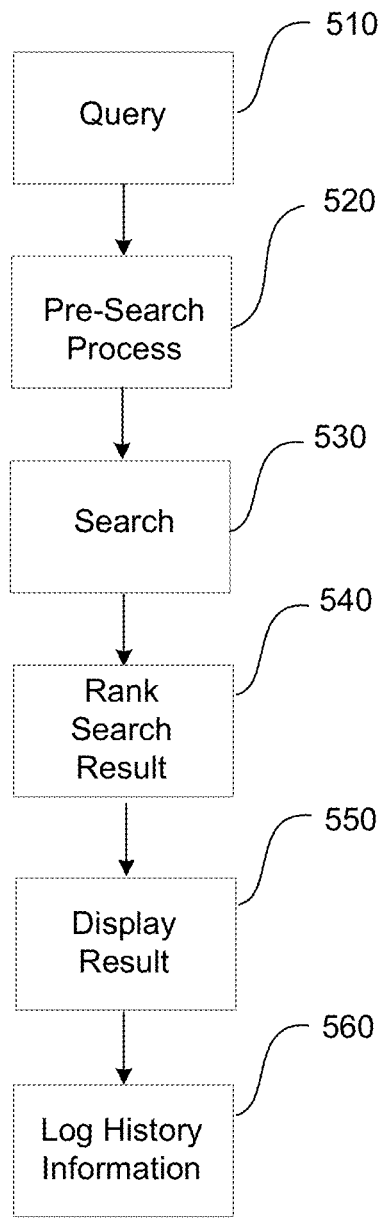

FIG. 5b shows another embodiment of a search process 501. The search process may have similar steps as that described in FIG. 5a. As such, common features may not be described or described in detail.

At step 510, a search query is fired by a user. A pre-search process is performed at step 520. The pre-search query processes the query to form an internal search query. For example, the internal search query is processed with static boost values. In one embodiment, the pre-search process facilitates a dynamically normalized search. The pre-search process includes acquiring user information. The user information includes, for example, information which identifies the user uniquely.

The internal search query is fired, initiating a search by the search engine at step 530. The search engine, in one embodiment, fires the internal search query over the master index. The master index, for example, contains the document index file of the BI artifacts in the repository.

Artifact hits containing contents matching the internal query are identified. Artifact hits are provided with hit scores. In one embodiment, usage history of a user is taken into account for determining the hit scores of artifact hits. For example, user information is used to determine if user usage history of artifact hits exists. User usage history, for example, includes information related to the number of times that artifact or artifacts have been opened based on a hit of a specific term and the index category or categories of the term where the hit or hits occurred in the artifacts. The usage history may also take into account of other information related to usage history.

The user usage history, for example, may be stored in an index. In one embodiment, user usage history is stored as documents in an index. In one embodiment, the user usage history is stored as documents in the master index. For example, the user usage history is stored as term information (terminfo) type documents, which contain user usage history information based on search terms.

If user usage history does not exist for an artifact hit, the hit score for that artifact hit is based on the default boost values. For example, the enterprise metadata index category has a default boost value of 1000, the document metadata index category has a default boost value of 100, the content metadata index category has a default boost value of 10 and content index category has a default boost value of 1.

On the other hand if usage history exists for an artifact hit, the user usage history of that artifact is used to determine the hit score. In one embodiment, the hit score is based on different usage categories. The usage categories, in one embodiment, include the number of times the artifact has been opened as well as the history hit count in the different index categories for a specific search term. Table 3 shows exemplary embodiment of different usage categories which is taken into consideration for determining the total hit score of an artifact hit.

TABLE 3

| Categories | Description |
|---|---|
| 1 | Artifact hit count |
| 2 | Enterprise Metadata hit count |
| 3 | Document Metadata hit count |
| 4 | Content Metadata hit count |
| 5 | Content hit count |

In one embodiment, if the value of the hit count in a usage category exceeds a minimum threshold value, a dynamic boost factor is applied to that category. The threshold values for the different usage categories are configurable. For example, the different usage categories may be set as desired based on application. In one embodiment, the minimum threshold values for the different usage categories may be the same. For example, the minimum threshold values are equal to 3. Providing other minimum threshold values may also be useful. It is understood that the minimum threshold values need not be the same for the different index categories. If the value of the hit count of a usage category does not exceed a minimum threshold value, a static boost value is applied to determine the hit score for that category.

The dynamic boost factor may be employed to increase the hit score of a usage category as compared to using the default boost value. In one embodiment, the dynamic boost factor or value may be equal to the history hit count value multiplied by the default boost value multiplied by 110% of the maximum default boost value if the hit count value exceeds a minimum threshold. Other dynamic boost factors may also be useful. For example, the dynamic boost factor or value may be equal to the default boost value multiplied by 110% of the maximum default boost value if the hit count value exceeds a minimum threshold. In the case of artifact usage category, the value is zero if it does not exceed the threshold value.

The total hit score of an artifact is equal to the sum of the hit scores in the different categories. A hit score in a category is equal to the number of hits in the current search multiplied by the boost value (default of dynamic boost).

At step 540, the search results are ranked based on hit scores. In one embodiment, the search results are ranked based on the hit scores from the highest to the lowest. In the case where two artifacts have the same hit score, they would be ranked similarly. In other embodiments, the search agent may provide the user with options as to how the artifacts are displayed. The artifact hits are displayed based on the hit scores at step 550.

The user may perform actions on the search result. For example, the user may open some artifacts while not others. The actions of the user are updated at step 560. In one embodiment, the actions of the user are updated in the boost index. For example, the actions of the user are stored in terminfo type documents. As discussed, the terminfo documents are part of the master index. A terminfo document may include information, such as search term, document ID, user ID, number of times the document has been opened, and hit history counts of the different index categories. Providing other types of information in the terminfo document may also be useful.

Providing boost values for index categories facilitates normalized search. For example, different kinds of artifacts may have different structures. However, the indexing maps the contents of the artifacts appropriately to the index categories and with the index category boost values, ranking is normalized irrespective of the designs or types of the artifacts. Furthermore, dynamic boosting takes into account user usage information, providing the user with more important artifacts at the beginning of a search result list.

In one embodiment, the ranking of the hit artifacts at step 540 may be modified based on device type. In one embodiment, the ranking includes a primary or initial ranking process which is based on the hit scores of the hit artifacts. A secondary ranking process is then performed to separate the hit artifacts by device type. For example, artifacts are separated into two groups. The primary group includes artifacts of the hit list which are supported or supportable by the user device type and the secondary group includes the remaining hit artifacts. The primary group is ranked based on the hit scores and the secondary group is ranked based on the hit scores.

Figure 6:
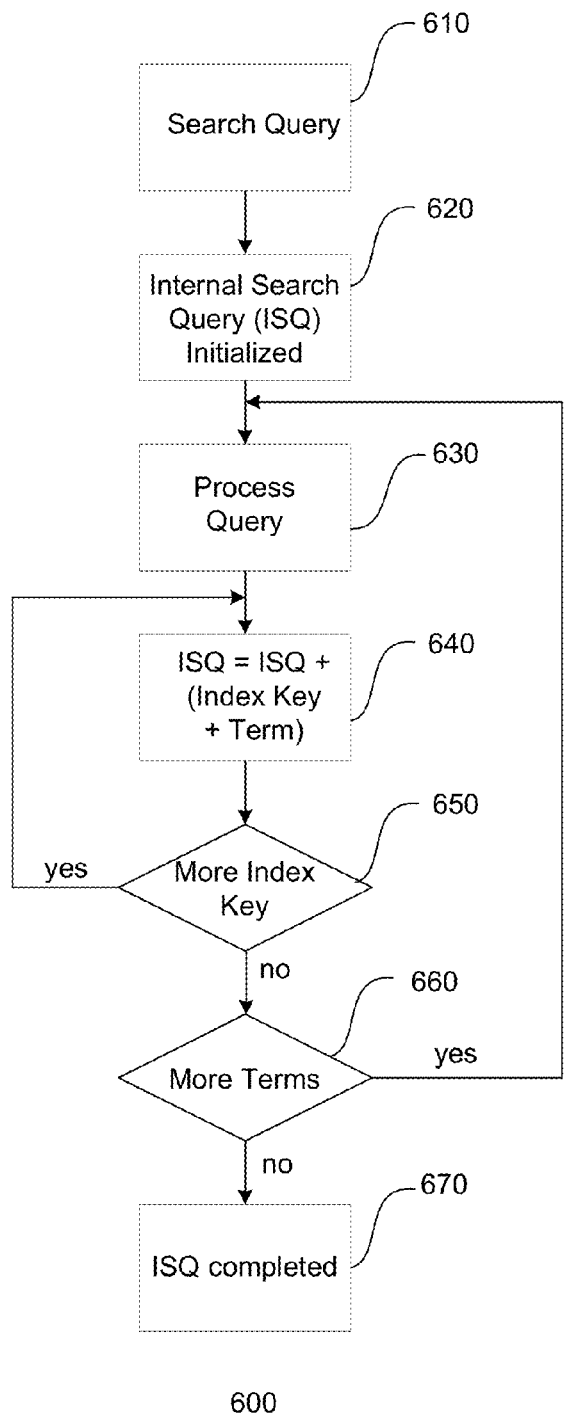
FIG. 6 shows an embodiment of a process for processing a query to form an internal search query.

FIG. 6 shows an embodiment of a process 600 for processing a query to form an internal search query (ISQ). As discussed, the internal search query includes the search terms of a search query with index keys appended thereto. In one embodiment, a search query from a user is provided at step 610. The search query, for example, may include one or more search terms. The search terms, for example, may include word, phrase and/or wildcard types of terms. The process is initialized at step 620. For example, the internal search query, when initialized is equal to zero.

The search agent, for example, processes the search query at step 630. In one embodiment, the process identifies a search term of the search query. At step 640, a first index category of the index categories is appended to the search term to form the internal search query. The default boost value for the first index category is also included. For example, index categories include enterprise metadata, document metadata, content metadata and content while enterprise metadata boost value is 1000, document metadata boost value is 100, content metadata boost value is 10 and content boost value is 1.

The process of step 640 is repeated until all index categories are appended to the search term. For example, if the process determines that there are more index keys and boost values to be appended at step 650, it returns to step 640. The index categories may be appended to a search term from the highest category, such as enterprise metadata to the lowest category, such as content. Other sequences of appending the index category to the search term may also be useful. When all index categories have been appended to the search term, the process continues to step 660. At step 660, the process determines if there are more terms in the search query to process. If there are, the process returns to step 630. The process is repeated until all terms have been appended with index categories. At step 670, the ISQ is completed and the process terminates.

As described, the processing of the ISQ produces subclasses for each search term equal to the number of index categories. For example, in the case of 4 index categories, each term produces 4 subclasses. Each subclass includes its respective default boost value. All subclasses of all terms are ORd together to form an internal search query.

Table 4 shows an exemplary embodiment of an internal search query for "India" having 4 index categories and associated default boost values.

TABLE 4

| Index Categories | Internal Search Query for term "India" | Default Boost values |
| --- | --- | --- |
| Enterprise Metadata | boe.search.enterprisemetadata: India | 1000 |
| Document Metadata | boe.search.documentmetadata: India | 100 |
| Content Metadata | boe.search.contentmetadata: India | 10 |
| Content | boe.search.content: India | 1 |

In the case where the search query has more than one term, each term of the query would be processed, as shown in Table 4 above, to produce four subclasses and ORd to form the internal search query. For example, the number of sub-classes in the internal search query is equal to:

$$ISQ = X_{terms} \times Y_{categories},$$

where $X_{terms}$ is equal to the number of search terms in the search query and $Y_{categories}$ is equal to the number if index categories.

Figure 7:
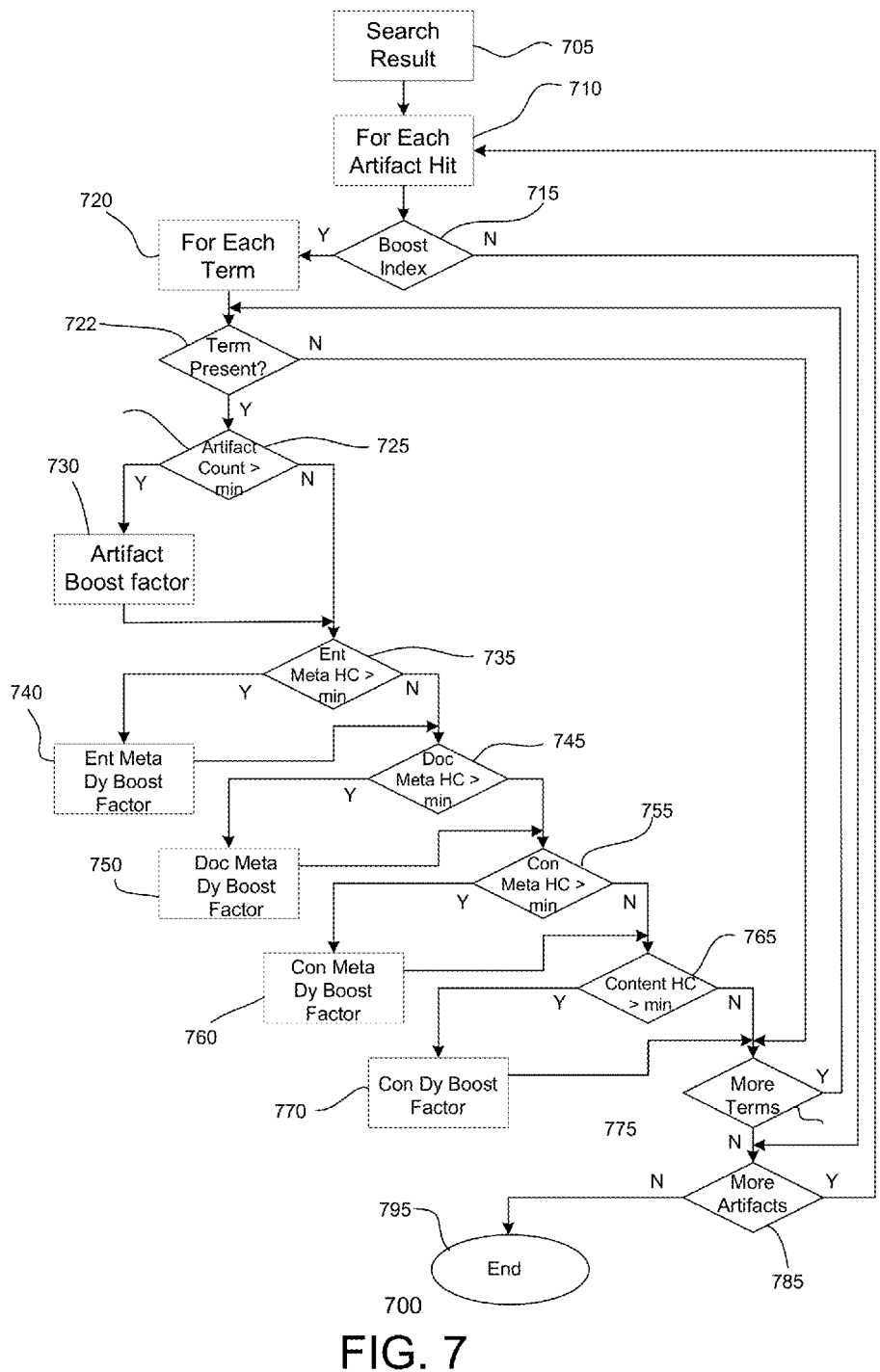
FIG. 7 shows an embodiment of a process for a dynamically normalized search.

FIG. 7 shows an embodiment of a process 700 for a dynamically normalized search. The dynamic normalized search process, for example, is performed after a search result is produced based on the static normalized search of FIG. 5a. For example, at step 705, the search result of a search query is provided based on the default boosting, as described in FIG. 6. The search result includes a list of artifact hits having contents matching the search query. The artifact hits are listed according to their hit score based on default boost values. The artifact hits, for example, are listed from the highest hit score to the lowest hit score.

The process processes an artifact hit (artifact of interest) at step 710. This process is repeated for each artifact hit listed in the search result. In one embodiment, the process processes artifact hits from the search results one artifact at a time. For example, the process may process the artifact hits from highest static hit score first to the lowest last. Processing the artifact hits in other orders may also be useful.

At step 715, the process determines if the artifact of interest has a boost index. The boost index indicates whether the user has a usage history with respect to the artifact of interest. For example, the process determines if there is a boost index document with the user ID and document ID of the artifact of interest. If no boost index exists for the artifact of interest, the process proceeds to 785 and determines if there are more artifacts to process. In the absence of a boost index, the hit score of the artifact of interest is derived from the default boost values, which has already been performed. If there are, the process returns to step 710 to process the next artifact on the search result list.

On the other hand, if a boost index exists, the process proceeds to step 720. The process from step 720 and onwards are processed for each term in the search query. For example, the process is performed one term of the search query at a time. The terms of a search query may be processed based on the order of the search terms in the search query or alphabetically. Other sequences of processing the search terms of the search query may also be useful.

At step 722, the process determines whether the boost index includes information regarding the term of the search query being processed (term of interest) is present. If the search term of interest is not present, the process proceeds to step 775 to process the next search term. If there are more search terms to be processed, the process proceeds to step 722 for processing of the next search term. However, if there are no more search terms to be processed, the process proceeds to step 785 to determine if there are more artifacts to be processed. If not, the process terminates at step 795.

If at step 722, history information related to the term of interest is present in the index file, the process proceeds to step 725, where it determines if the artifact hit count in the boost index is greater than the minimum artifact hit count threshold. The artifact hit count, for example, is the times that the artifact has been opened by the user based on the search term of interest. The minimum threshold value, for example, is 3. Providing other minimum threshold values may also be useful.

If the artifact hit count exceeds the minimum threshold, the current boost factor, which is applied to derive the boost score, is equal to a dynamic artifact boost factor at step 730. A dynamic boost factor, in one embodiment, is equal to the hit count in the boost index multiplied by the default boost value multiplied by 110% of the maximum default boost value. For example, the dynamic boost factor is equal to:

hit count*(1*1100)

Other dynamic boost factors may also be useful. For example, the dynamic boost factor may be the default boost value multiplied by the 110% of the maximum default boost factor. In the event that there is no default boost value, as in the case of the artifact hit category, it is, for the purpose of the dynamic boost factor, equal to 1. In the case where the artifact hit count is equal to 4, the current boost factor is equal to:

dynamic boost factor=4*(1*1100)

In the case wherein the dynamic boost factor is applied, the artifact boost score is then equal to 1 times the dynamic artifact boost factor. The process proceeds to step 735. If the minimum threshold value is not exceeded, the current boost factor is equal to the default boost factor, which in this case is equal to zero.

In one embodiment, at step 735, the process determines if the enterprise metadata index category hit count for the term of interest of the artifact of interest in the boost index exceeds a minimum enterprise metadata threshold value. The minimum enterprise metadata threshold value, for example, is 3. Providing other minimum threshold values may also be useful. If the enterprise metadata hit count in the index boost exceeds the minimum threshold, the process proceeds to step 740. At step 740, the current enterprise metadata boost factor is equal to a dynamic enterprise metadata boost factor. The dynamic enterprise metadata boost factor, for example is equal to:

hit count*default boost value*(110% maximum boost value); or hit count*1000*1100.

In the case where the hit count is 5, the dynamic enterprise metadata boost factor is equal to:

5*1000*1100.

Other boost factors may also be useful. In another embodiment, the boost factor is equal to:

default boost value*(110% maximum boost value); or

1000*1100.

The dynamic enterprise metadata boost factor is used to derive the enterprise metadata hit score. The enterprise metadata hit score is equal to the number of hits in the enterprise metadata index category multiplied by the dynamic boost factor. For example, if there is 1 match in the enterprise metadata index category, the enterprise metadata hit score is equal to:

1*the boost factor; or

1*(5*1000*1100).

In another embodiment, where the boost factor is equal to the default boost value multiplied by 110% of the maximum default boost value, the enterprise metadata hit score is equal to:

1*(1000*1100)

The process proceeds to step 745.

If the minimum threshold value is not exceeded, the enterprise current boost factor is equal to the default boost value or factor. The enterprise metadata hit score is equal to the number of hits in the enterprise metadata index category multiplied by the default boost value. For example, if there is 1 match in the enterprise metadata index category, then the enterprise metadata hit score is equal to 1*1000. The process proceeds to step 745.

In one embodiment, at step 745, the process determines if the document metadata index category hit count for the term of interest of the artifact of interest in the boost index exceeds a minimum document metadata threshold value. The minimum document metadata threshold value, for example, is 3. Providing other minimum threshold values may also be useful. If the document metadata hit count in the boost index exceeds the minimum threshold, a dynamic document metadata boost factor is provided to derive the document metadata hit score at step 750. The dynamic boost factor is similar to that described with respect to the dynamic enterprise metadata boost factor, except for the different default boost value (e.g., 100 instead of 1000). The document metadata hit score is equal to the hit count in the current search multiplied by the dynamic boost factor. The process proceeds to step 755. If the minimum threshold value is not exceeded, the document metadata hit score is equal to the current hit count in the document metadata index category multiplied by the default document metadata boost value, which, for example, is equal to 1*100 for a hit count of 1. The process proceeds to step 755.

The process determines if the content metadata index category hit count for the term of interest of the artifact of interest in the boost index exceeds a minimum content metadata threshold value at step 755. The minimum content metadata threshold value, for example, is 3. Providing other minimum threshold values may also be useful. If the content metadata hit count in the boost index exceeds the minimum threshold, a dynamic content metadata boost factor is provided to derive the content metadata hit score at step 760. The dynamic boost factor is similar to that described with respect to the dynamic enterprise metadata boost factor, except for the different default boost value (e.g., 10 instead of 1000). The content metadata hit score is equal to the hit count in the current search multiplied by the dynamic boost factor. The process proceeds to step 765. If the minimum threshold value is not exceeded, the content metadata hit score is equal to the current hit count multiplied by the default content metadata boost value, which, for example, is equal to 1*10 for a hit count of 1. The process proceeds to step 765.

At step 765, the process determines if the content index category hit count for the term of interest of the artifact of interest in the boost index exceeds a minimum content threshold value. The minimum content threshold value, for example, is 3. Providing other minimum threshold values may also be useful. If the content hit count in the boost index exceeds the minimum threshold, a dynamic content boost factor is provided to derive the content hit score at step 770. The dynamic boost factor is similar to that described with respect to the dynamic enterprise metadata boost factor, except for the different default boost value (e.g., 1 instead of 1000). The content metadata hit score is equal to the hit count in the current search multiplied by the dynamic boost factor. The process proceeds to step 775. If the minimum threshold value is not exceeded, the content hit score is equal to the current hit count multiplied by the default content boost value, which, for example, is equal to 1*1 for a hit count of 1. The process proceeds to step 775.

At step 775, the process determines whether there are more search terms to be processed. If there are more search terms to be processed, the process proceeds to step 722 for processing of the next search term. However, if there are no more search terms to be processed, the process determines the overall hit score of the artifact of interest. The overall hit score is the sum of all the hit scores in the different categories. The process then proceeds to step 785 to determine if there are more artifacts to be processed. If not, the process terminates at step 795.

As described, the overall hit scores of all the artifacts are provided. The hit scores may be dynamically boosted, partially dynamically boosted or based on static boosting, depending on usage history. The dynamic boost factors, as illustrated, are the same. For example the dynamic boost factor is equal to the hit count multiplied by 110% of the maximum default boost value. However, it is understood that the dynamic boost factors may be configurable to have other values or may be different for different categories.

Figure 8A:
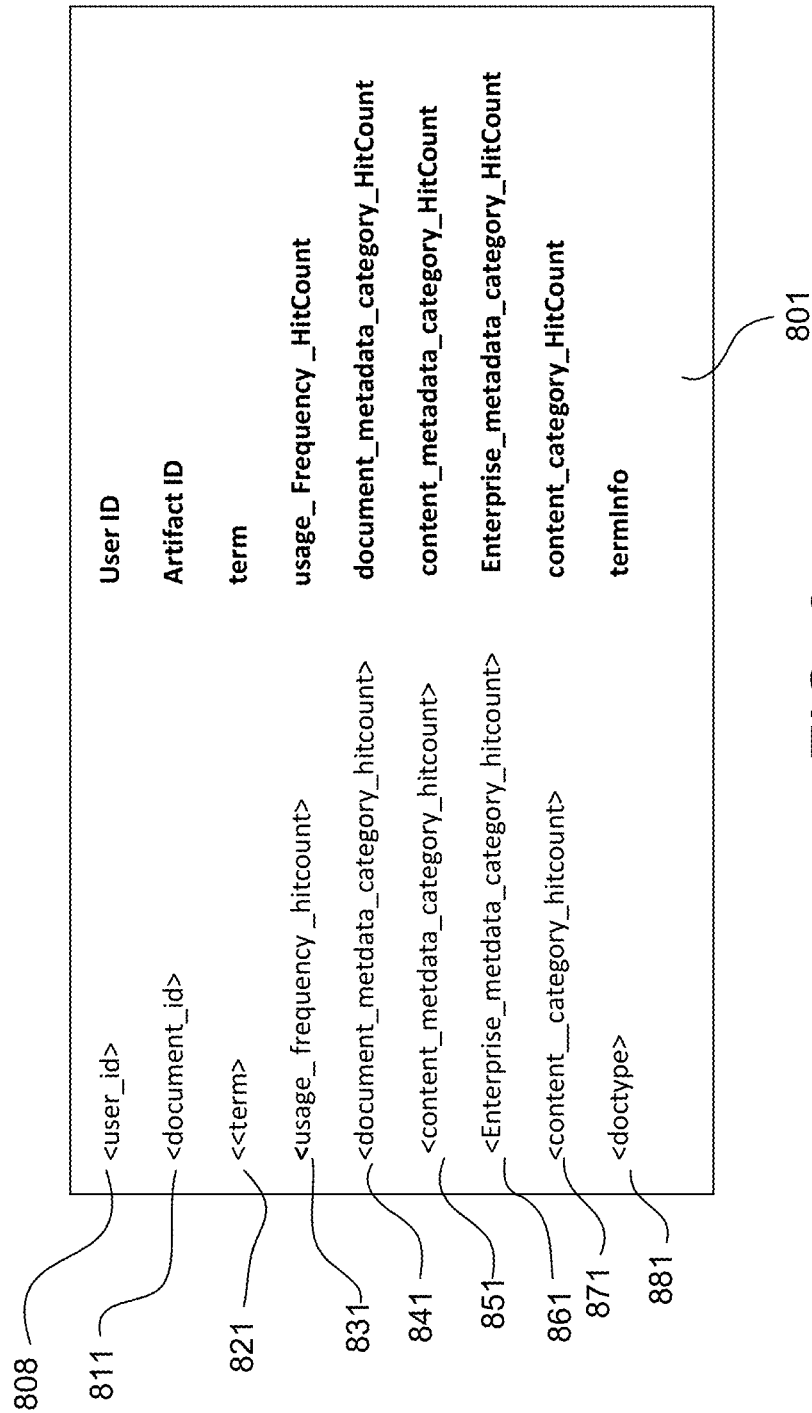
FIGS. 8a-b show embodiments of index boost and type index documents.

FIG. 8a shows an exemplary embodiment of a boost index document 801. As discussed, the boost index document contains usage history information of a user. The information of the user usage history may be used to determine whether a dynamic boost factor is applied or not to artifact hits of a search result. The boost index document, for example, is part of the master index. The master index may include numerous boost index documents. The boost index document has the same or similar structure as other documents in the master index. For example, the boost index document has a similar structure as the index documents which maps source content to index categories.

In one embodiment, the boost index document includes fields having name/value pairs. The name portion defines the type of information while the value defines the actual information. In one embodiment, the boost index document includes a document type field 881. The value indicates that the boost index is a terminfo type of document. For dynamic boosting, the search agent searches index documents of the terminfo type in the master index.

A user ID field 808 is provided. The user ID indicates the user to whom the usage history information pertains. For example, the value portion of field contains the user ID information identifying the user. The boost index document also includes a document ID field 811. The value portion contains the actual artifact ID to which information of the boost index document relates.

The boost index document, for example, is categorized based on search terms. For example a term field 821 is provided. The term field includes a name portion indicating that the field is a term field and the value portion identifies the actual search term. Hit count fields 831-861 are grouped under the term field. The hit count fields contain history hit counts of the different index categories for the term in the term field as well as the number of times the artifact in the document ID has been opened with respect to the term in the term field.

For example, usage frequency hit count field 831 contains the number of times that the artifact in the artifact ID has been previously opened by the user when searching using the term in the term field. The document metadata category hit count contains the cumulative value of hit counts in the document metadata index category for the artifact identified in the document ID field with respect to the term identified in the term field. Similarly, the other index category hit count fields contain the cumulative values of hit counts for the other index categories for the artifact identified in the document ID field with respect to the term identified in the term field. It is understood that an artifact may have different search terms associated with it. For example additional search terms and associated hit count fields may be provided for the same artifact.

Figure 8B:
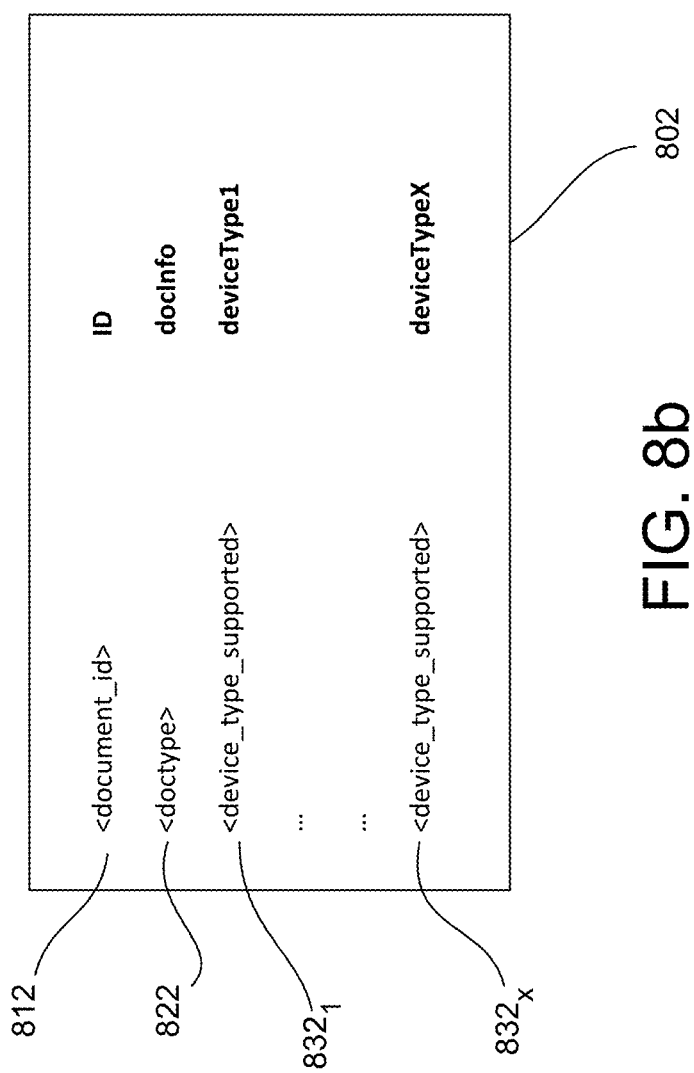

FIG. 8b shows an exemplary embodiment of a type index document 802. The type index document contains information related to the types of devices used to access an artifact. The device information may be employed to modify the rankings of a search result based on device type of the user performing the search. The type index document, for example, is part of the master index. The master index may include numerous type index documents. The type index document has the same or similar structure as other documents in the master index. For example, the type index document has a similar structure as the index documents which maps source content to index categories or boost index documents.

In one embodiment, the type index document includes fields having name/value pairs. The name portion defines the type of information while the value defines the actual information. In one embodiment, the type index document includes a document type field 822. The value indicates that the document type is a docinfo type document. The search agent searches only index documents of the docinfo type to modify the search ranking based on device type.

A document ID field 812 is provided. The value portion contains the actual artifact ID to which information of the type index document relates. The document ID, for example, is a unique identifier for the artifact in the repository. The document ID indicates the information of which the document pertains.

One or more device type fields $832_1$-$832_x$ is provided. The device type fields indicate the devices which were used to previously open the artifact listed in the document ID field. The number of fields is equal to the number of different device types accessed. For example, in the case where 2 different types of device have been used to access the artifact in the document ID field, then x is equal to 0. If an artifact has no history of being accessed, then the type document for that artifact would not exist in the master index.

Figure 8C:
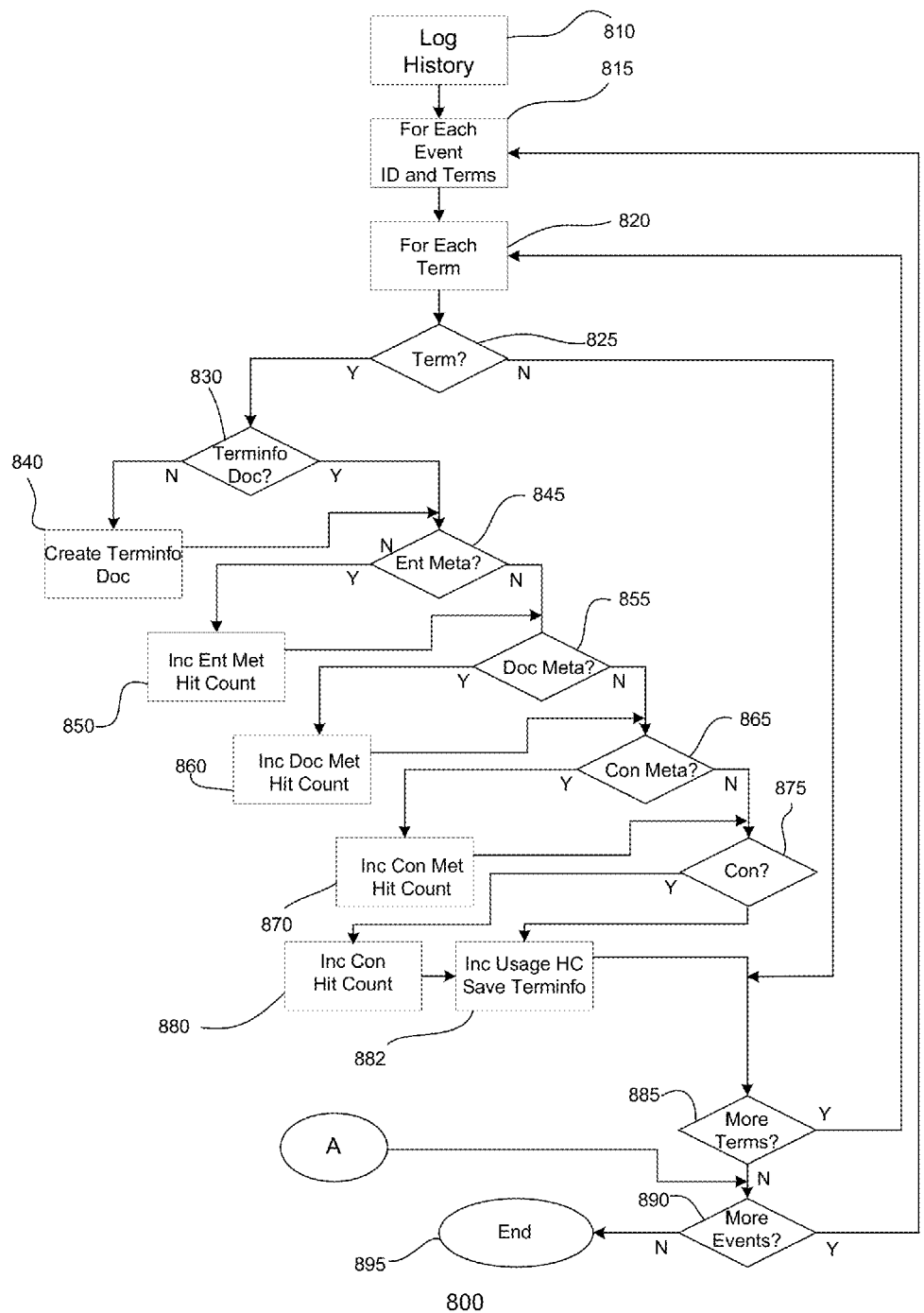
FIGS. 8c-d show embodiments of processes for updating and creating index boost and type index documents;
FIGS. $9a_{1-3}$ show examples of artifacts; and
FIGS. $9b_{1-3}$ show examples of index documents corresponding to artifacts of FIGS. $9a_{1-3}$.

FIG. 8c shows an embodiment of a process 800 for creating or updating a boost index. Whenever a search is performed by a user, a search history log is created 810. An event is generated and stored in the history log when an artifact in the search result is opened by the user. In one embodiment, the event contains the search terms, document ID, user ID and device type. Providing other types of information for an event may also be useful. The number of events in the history log, for example, is equal to the number of artifacts opened by the user.

The process from step 815 and onwards is performed for each event in the history log. At step 815, the user ID and document ID and terms of an artifact opened from the search are obtained from the history log. For example, on the first iteration, the information related to the first event or first artifact is obtained (artifact of interest). Other sequences of processing the events in the history log may also be useful. Using the document ID, the index document corresponding to the artifact of interest is obtained. The index document of interest, for example, is stored in memory.

In some embodiments, there may be more than one index documents associated with an artifact. For example, a master index document and one or more object index documents may be associated with an artifact. In one embodiment, the master index document pertaining to the artifact of interest is retrieved. In other embodiments, all index documents, including the master and object index documents pertaining to the artifact of interest are obtained and stored in memory, for example, in an array, such as Array A. Generally, retrieving the master index document is sufficient since the object index documents contain information already contained in the master index document.

The process from step 820 is performed for each search term in the search query. The processing may be in the sequence for the first search term to the last. Other sequences for processing the search terms may also be useful. At step 825, the process determines if the search term (search term of interest) is present in the index document. If the search term of interest is not present in the index document of interest, the process proceeds to step 885 to determine if there are more terms in the search query to process. The process at step 885 returns to step 820 if there are more search terms to process.

If the search term of interest exists in the index document of interest, the process proceeds to step 830. At step 830, the process determines if user usage history exists for the term of interest. For example, the process determines if a boost index (terminfo) document of interest exists with the corresponding search term of interest, user ID of interest and document ID of the artifact of interest. If a terminfo document of interest exists, the process proceeds to step 845.

On the other hand, if no terminfo document of interest exists, the process proceeds to step 840 to create a new terminfo document with the corresponding term of interest, user ID of interest, and document ID of interest. The new terminfo document is created with the fields of a terminfo document. For example, the new terminfo document includes doctype field with the value terminfo, document ID field with the document ID of the artifact of interest, and user ID field with the user ID of interest. In one embodiment, the new terminfo document of interest also includes enterprise metadata hit count field, document metadata hit count field, content metadata hit count field, content hit count field, and artifact hit count field, all initialized to have values of 0. The process proceeds to step 845 after creating the new terminfo document of interest.

The process continues to determine which index categories in the index documents contain the term of interest. For index categories containing the term of interest, the hit count values corresponding to those index categories are incremented. As for index categories which do not contain a match for the term of interest, the hit count values for these index categories remain the same.

In one embodiment, at step 845, the process determines if the search term of interest is in the enterprise metadata index category in the index document of interest. If the search term of interest is part of the enterprise metadata index category in the index document, the process proceeds to step 850 to increment by 1 the hit count value for the enterprise metadata hit count field in the terminfo document of interest. After incrementing the enterprise metadata hit count field, the process continues to step 855. If the search term of interest is not in the enterprise metadata index category of the index document, the process proceeds to step 855.

The process, at step 855, determines if the search term of interest is in the document metadata index category in the index document of interest. If the search term of interest is part of the document metadata index category in the index document, the process proceeds to step 860. At step 860, the hit count value for the document metadata hit count field in the terminfo document of interest is incremented by 1. After incrementing the document metadata hit count field, the process continues to step 865. If the search term of interest is not in the document metadata index category of the index document, the process proceeds to step 865.

The process determines if the search term of interest is in the content metadata index category in the index document of interest at step 865. If the search term of interest is part of the content metadata index category in the index document, the process proceeds to step 870 where the hit count value for the content metadata hit count field in the terminfo document of interest is incremented by 1. After incrementing the content metadata hit count field, the process continues to step 875. If the search term of interest is not in the content metadata index category of the index document, the process proceeds to step 875.

At step 875, the process determines if the search term of interest is in the content index category in the index document of interest. If the search term of interest is part of the content index category in the index document, the process proceeds to step 880 where the hit count value for the content hit count field in the terminfo document of interest is incremented by 1. After incrementing the content hit count field, the process continues to step 882. If the search term of interest is not in the content index category of the index document, the process proceeds to step 882.

In one embodiment, the process increases the artifact hit count value of the artifact hit count field by 1 in the terminfo of interest at step 882. After incrementing the artifact hit count value, the process proceeds to step 885 to determine if there are more search terms to process. If there are more search terms to process, it returns to step 820. On the other hand, if all search terms of the search query have been processed, the process continues to step 890.

At step 890, the process determines if there are more events which need to be processed. Upon a determination that events remained which need processing, the process returns to step 815. Otherwise, the process terminates at step 895.

Figure 8D:
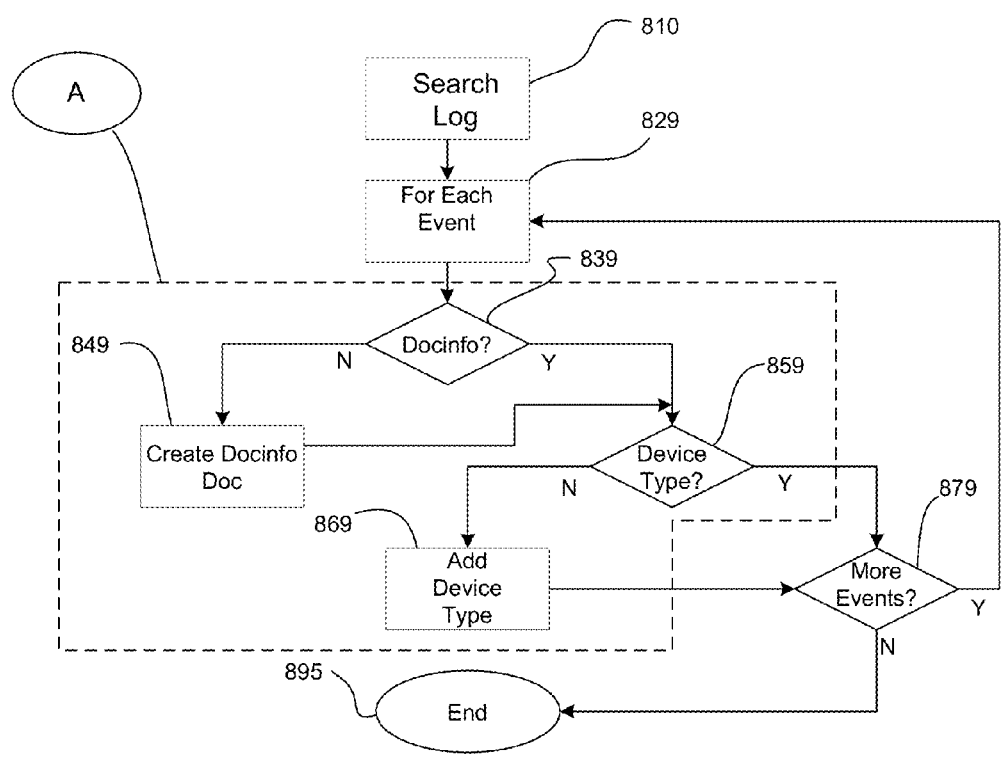

FIG. 8d shows an embodiment of a process 804 for creating or updating a type index (docinfo) document. Whenever a search is performed by a user, a search history log is created at step 810. An event is generated and stored in the history log when an artifact in the search result is opened by the user. In one embodiment, the event contains the search terms, document ID, user ID and device type. Providing other types of information for an event may also be useful. The number of events in the history, for example, is equal to the number of artifacts opened by the user.

The process from steps 829 and onwards are performed for each event in the history log. At step 829, the document ID (artifact of interest) and device type (device type of interest) which accessed the artifact are obtained from an event of the history log. For example, on the first iteration, the information related to the first event or first artifact is obtained. Other sequences of processing the events in the history log may also be useful.

At step 839, the process determines if there exists a docinfo document pertaining to the artifact of interest. For example, the process searches the master index for a docinfo with a document ID field having a value which matches the artifact of interest. If a docinfo of interest exists, the process proceeds to step 859. The presence of a docinfo of interest indicates that the artifact of interest has been accessed previously.

If no docinfo of interest exists, the process proceeds to step 849 to create a new docinfo document. The absence of a docinfo of interest indicates that the artifact has not been accessed before. The new terminfo document is created, for example, with the doctype and document ID fields. The value of the doctype field is docinfo and the value for the document ID field is equal to the ID of the artifact of interest. Since no devices have accessed the artifact of interest, the docinfo does not have any device type fields. The process continues to step 859 after creating a docinfo of interest.

At step 859, the process determines if the device type of interest exists in any of the device type fields in the docinfo of interest. If the device type of interest already exists, the process proceeds to step 879. On the other hand, if no device type of interest exists, the docinfo of interest is updated to include a new device type field with the value corresponding to the device type of interest at step 869. The process then continues to step 879.

The process, at step 879 determines if there are more events which need to be processed. Upon a determination that events remained which need processing, the process returns to step 829. Otherwise, the process terminates at step 895.

In some embodiments, particularly for application which includes both dynamic boosting and ranking based on device type functions, the processes of FIGS. 8c-d may be integrated together. In one embodiment, the steps enclosed in A in FIG. 8d can be integrated into the negative path of step 885, as indicated in FIG. 8c. Other techniques can also be used to integrate the processes.

An example is provided to illustrate dynamic normalization. The example includes three artifacts $901_{1-3}$ stored in the repository, as depicted by FIGS. $9a_{1-3}$. As shown, the first document $901_1$ is titled Global Sales Report I by Author I, the second document $901_2$ is titled Global Sales Report II by Author II, and the third document $901_3$ is titled India Sales Report authored by Author III. The respective index documents $902_{1-3}$ are shown in FIGS. $9b_{1-3}$. The artifact is separated into four index categories, which are enterprise metadata, document metadata, content metadata, and content. The static or default boost values for the different categories are:

Enterprise metadata=1000;
Document metadata=100;
Content metadata=10; and
Content=1.

In the case of static boosting, a hit score of an artifact hit is equal to the sum of the hit scores of the different categories, wherein the hit score of a category is equal to:

$$\text{hit count} * \text{default boost value,}$$

Where
hit count=hit count of the current search in the relevant category, and
default boost value=default boost value in the relevant category.

The boost factor for dynamic boosting, for the example, is generally equal to:

$$\text{hit count} * \text{default boost value} * 110\% \text{ maximum default boost value,}$$

where
hit count=hit count for the relevant category in a boost index document containing user usage history, and
default boost value=default boost value for the relevant category.

Providing other dynamic boost factors may also be useful

If a search using search term "India" is performed by user 1, the ranking of the artifacts based on the static index boost values is shown in Table 5.

TABLE 5

| Order | Artifact | Score |
| --- | --- | --- |
| 1 | India Sales Report | 1010 |
| 2 | Global Sales Report II | 10 |
| 3 | Global Sales Report I | 1 |

For example, the ranking will be according to Table 5 if the usage history of User 1 does not have any index categories which exceed the minimum threshold value.

Assume that the usage history of User 1 in the content index category exceeds the minimum threshold in the index boost document with a hit count value of 5. In such case, the boost value for the content index category is equal to the content dynamic index value, which is equal to 5*1*1100. Accordingly, the ranking of the artifacts is reordered, as shown in the following Table 6.

TABLE 6

| Order | Artifact | Score |
| --- | --- | --- |
| 1 | Global Sales Report I | 5500 |
| 2 | India Sales Report | 1010 |
| 3 | Global Sales Report II | 10 |

The search engine may be embodied as an application. For example, the search engine may be embodied as a software application. The application may be integrated into an existing software application, such as a BI application, as an add-on or plug-in to an existing application, or as a separate application. The existing software application may be a suite of software applications. The source code of the search system may be compiled to create an executable code. The codes of the search system, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of searching by a processor comprising:
   generating a master index having a plurality of index documents corresponding to artifacts stored in a repository,
      wherein an index document is associated with a source artifact, the index document indexes the associated source artifact according to a list of index keys,
      wherein index keys are separated into index categories corresponding to logical levels of source artifacts, the logical levels include metadata and content levels,
      wherein index categories are assigned respective boost values to indicate relative importance of the index categories,
      index keys are assigned boost values of their associated index categories:
   firing a search query by a user to search the master index;
   generating a result list of artifacts matching (hit) the search query; and
   ranking artifacts in the list based on hit scores of the artifacts (artifact hit scores), wherein
      an artifact hit score is based on a total score of individual hits (individual hit scores) of the artifact,
      an individual hit score of an artifact is equal to the boost value of the assigned boost value of the index key associated with the hit.

2. The method of claim 1 wherein the artifacts comprise business intelligence artifacts.

3. The method of claim 1 wherein the hit scores are calculated based on a sum of all index category scores, wherein each index category score is equal to the number of hits in that category multiplied by the boost value.

4. The method of claim 1 wherein the index categories are based on structures of the artifacts in the repository.

5. The method of claim 2 wherein the index categories corresponding to logical levels of source artifacts comprise:
   enterprise metadata, wherein enterprise metadata relates to content which identifies different artifacts in the repository;
   document metadata, wherein document metadata relates to general meta properties of an artifact in the repository;
   content metadata, wherein content metadata relates to different fields in an artifact; and
   content, wherein content relates to content in an artifact.

6. The method of claim 1 wherein the boost values for the different index categories are configurable depending on the relative importance of the index categories.

7. The method of claim 6 wherein the index categories and boost values comprise:
   enterprise metadata configured with the highest boost value;
   document metadata configured with the second highest boost value;
   content metadata configured with the third highest boost value; and
   content configured with the lowest boost value.

8. The method of claim 1 wherein the artifacts stored in the repository includes artifacts having different types of structures.

9. The method of claim 1 comprises processing the search query to form an internal search query which is used to search the index documents in the master index.

10. The method of claim 9 wherein processing the search query comprises:
    forming sub-classes associating a term of the search query with each of the index categories; and
    ORing the sub-classes to form the internal search query.

11. The method of claim 10 wherein forming sub-classes are performed for all terms of the search query and ORing the sub-classes of all terms to form the internal search query.

12. The method of claim 1 comprises generating usage history documents, wherein a user history document includes user ID, artifact ID, search term, and history hit counts in the different index categories with respect to the user ID, artifact ID and search term.

13. The method of claim 12 comprises storing usage history document in the master index.

14. The method of claim 12 wherein the boost values are default boost values which are changed to dynamic boost values based on the usage history documents with respect to the search term, user ID, artifact ID and hit counts in the different index categories in the usage history documents.

15. The method of claim 14 wherein the dynamic boost values are applied to derive the hit score of the artifact corresponding to a document ID for those index categories having hit counts exceeding a minimum threshold value.

16. The method of claim 1 comprises generating device type documents, wherein a device type document includes an artifact ID and device types which have accessed artifact corresponding to the artifact ID.

17. The method claim 16 wherein rankings of the artifacts are modified based on device type which the user is using.

18. A non-transitory computer-readable medium having stored thereon program code, the program code is executable by a computer to:
    generate a master index having a plurality of index documents corresponding to artifacts stored in a repository,
       wherein an index document is associated with a source artifact, the index document indexes the associated source artifact according to a list of index keys,
       wherein index keys are separated into index categories corresponding to logical levels of source artifacts, the index categories comprises
          enterprise metadata, wherein enterprise metadata relates to content which identifies different artifacts in the repository,
          document metadata, wherein document metadata relates to general meta properties of an artifact in the repository,
          content metadata, wherein content metadata relates to different fields in an artifact, and
          content, wherein content relates to content in an artifact,
       wherein index categories are assigned respective boost values to indicate relative importance of the index categories, index keys are assigned boost values of their associated index categories;

fire a search query by a user to search the master index;

generate a result list of artifacts matching (hit) the search query; and rank artifacts in the list based on hit scores of the artifacts (artifact hit scores), wherein
    an artifact hit score is based on a total score of individual hits (individual hit scores) of the artifact,
    an individual hit score of an artifact is equal to the boost value of the assigned boost value of the index key associated with the hit.

19. The non-transitory computer-readable medium of claim 18 wherein the boost values are default boost values and the program code is further executable by the computer to change the default boost values to dynamic boost values based on user usage history documents with respect to a search term, user ID, artifact ID and hit counts in the different index categories in the usage history documents.

20. A system comprising:
- a memory for storing non-transitory computer-readable program code; and
- a processor in communication with the memory, the processor being operative with the computer-readable program code to generate a master index having a plurality of index documents corresponding to artifacts stored in a repository,
    wherein an index document is associated with a source artifact, the index document indexes the associated source artifact according to a list of index keys, wherein index keys are separated into index categories corresponding to logical levels of source artifacts,
    wherein the index categories comprise
        enterprise metadata, wherein enterprise metadata relates to content which identifies different artifacts in the repository,
        document metadata, wherein document metadata relates to general meta properties of an artifact in the repository,
        content metadata, wherein content metadata relates to different fields in an artifact, and
        content, wherein content relates to content in an artifact, and
wherein index categories are assigned respective boost values to indicate relative importance of the index categories,
    index keys are assigned boost values of their associated index categories;

fire a search query by a user to search the master index;

generate a result list of artifacts matching (hit) the search query; and rank artifacts in the list based on hit scores of the artifacts (artifact hit scores), wherein
    an artifact hit score is based on score of individual hits (individual hit scores) of the artifact,
    an individual hit score of an artifact is equal to the boost value of the assigned boost value of the index key associated with the hit.

\* \* \* \* \*